(12) United States Patent
Hatakeyama et al.

(10) Patent No.: US 11,377,529 B2
(45) Date of Patent: Jul. 5, 2022

(54) COMPOSITE STRETCHABLE FILM AND METHOD FOR FORMING SAME

(71) Applicant: SHIN-ETSU CHEMICAL CO., LTD., Tokyo (JP)

(72) Inventors: Jun Hatakeyama, Joetsu (JP); Motoaki Iwabuchi, Joetsu (JP); Joe Ikeda, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 221 days.

(21) Appl. No.: 16/672,915

(22) Filed: Nov. 4, 2019

(65) Prior Publication Data

US 2020/0190275 A1 Jun. 18, 2020

(30) Foreign Application Priority Data

Dec. 18, 2018 (JP) .............................. JP2018-236758

(51) Int. Cl.
*C08J 5/18* (2006.01)
*C08F 283/00* (2006.01)
(Continued)

(52) U.S. Cl.
CPC ............. *C08J 5/18* (2013.01); *C08F 283/008* (2013.01); *C08J 3/28* (2013.01); *C08J 7/08* (2013.01);
(Continued)

(58) Field of Classification Search
None
See application file for complete search history.

(56) References Cited

U.S. PATENT DOCUMENTS

2018/0142409 A1\* 5/2018 Maeda ................... D06N 3/128
2018/0215876 A1 8/2018 Hatakeyama et al.

FOREIGN PATENT DOCUMENTS

EP 3354670 A1 8/2018
JP 2001-018329 A 1/2001
(Continued)

OTHER PUBLICATIONS

Jan. 4, 2021 Office Action issued in Korean Patent Application No. 10-2019-0157697.
(Continued)

*Primary Examiner* — Jeffrey D Washville
(74) *Attorney, Agent, or Firm* — Oliff PLC

(57) ABSTRACT

The present invention is a composite stretchable film including: a surface film which is a cured product of a polyurethane 1 containing a copolymer of one or more of units "a1" to "a4" and silicone-pendant type urethane units "b1" and/or "b2" represented by the following general formula (1); and an inner film which is a cured product of a polyurethane 2 containing a unit "c" having polyether and urethane bonds represented by the following general formula (2), on which the surface film is laminated. The present invention provides a stretchable film that has excellent stretchability and strength, with the film surface having excellent water repellency, and a method for forming the same.

$$\left[ \underset{O}{\overset{H}{\underset{N}{\bigvee}}} O + R^1 - O + \underset{O}{\overset{}{\bigvee}} - O + R^2 - O + \underset{m}{\overset{}{\bigvee}} \underset{O}{\overset{H}{\underset{N}{\bigvee}}} \right]_{a1} \quad (1)$$

(Continued)

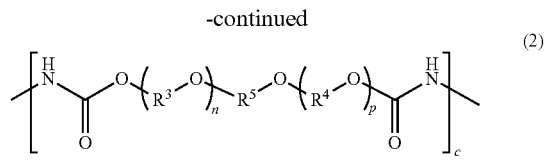

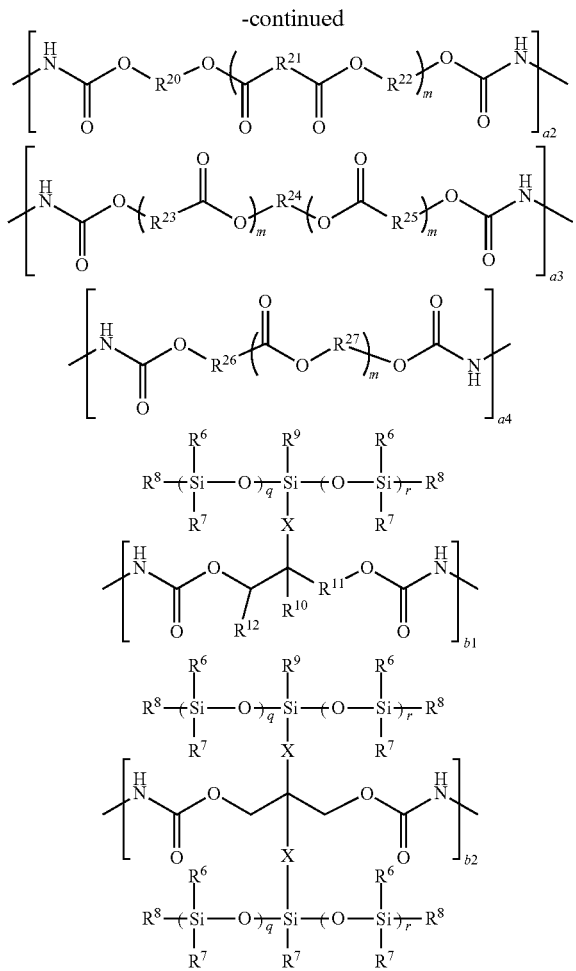

8 Claims, 5 Drawing Sheets

(51) Int. Cl.
    *C08J 3/28*     (2006.01)
    *B29C 71/02*     (2006.01)
    *H01B 3/30*     (2006.01)
    *H01B 3/44*     (2006.01)
    *H01B 3/46*     (2006.01)
    *H01B 7/04*     (2006.01)

(52) U.S. Cl.
    CPC .......... *H01B 3/302* (2013.01); *C08J 2351/08* (2013.01); *H01B 3/447* (2013.01); *H01B 3/46* (2013.01); *H01B 7/04* (2013.01)

(56) References Cited

FOREIGN PATENT DOCUMENTS

JP     2004-033468 A     2/2004
JP     2012-152725 A     8/2012

OTHER PUBLICATIONS

Apr. 14, 2020 Search Report issued in European Patent Application No. 19206120.8.

\* cited by examiner

COMPOSITE STRETCHABLE FILM AND METHOD FOR FORMING SAME

TECHNICAL FIELD

The present invention relates to a composite stretchable film and a method for forming the same.

BACKGROUND ART

A recent broader spread of Internet of Things (IoT) has accelerated the development of wearable devices typically including internet-accessible watches and glasses. Even in the fields of medicine and sports, wearable devices capable of constantly monitoring the user's physical state are increasingly required, and such technological development is expected to be further encouraged.

One such wearable device is a type of attachment to a user's body for constantly monitoring its physical state. A wearable device normally includes a bio-electrode for detecting electric signals transmitted from a body, wires for sending the electric signals to a sensor, a semiconductor chip serving as the sensor, and a battery, in addition to an essential adhesive pad for attachment to the skin. Patent Document 1 describes detailed structures of a bio-electrode part, a wiring part connected to the electrode part, and an adhesive pad. In the wearable device disclosed in Patent Document 1, a silicone-based adhesive film is provided around the bio-electrode part, and the bio-electrode part and a sensor device are connected by a meandering-shaped elastic silver wiring part coated with an elastic urethane film.

Advantageously, such a urethane film has high elasticity and strength, and excellent mechanical properties as a film coated on an elastic wiring part. The hydrolysis inherent in a urethane film unfortunately lowers its elasticity and strength, while a silicone film has no such hydrolysis, but the strength inherently remains low.

To overcome this drawback, the development of silicone urethane polymers whose main chain has both a urethane bond and a siloxane bond has been examined. Advantageously, a cured product of a silicone urethane polymer exhibits higher strength than a single silicone component and lower hydrolysis than a single polyurethane component. Such a cured product, however, fails to achieve the strength equivalent to a single polyurethane component and the water repellency equivalent to a single silicone component, and both of the strength and water repellency are restricted to in-betweens of silicone and polyurethane components.

A highly elastic urethane film exhibits a typical feature of tacky surface for a user to touch. Accordingly, films that are adhered to each other don't separate due to their surface tackiness. When such a urethane film is screen-printed, the film adheres to a printing plate to cause defective printing. Meanwhile, silicone films don't adhere to each other due to high peeling property. Since silicone is low in strength, however, thin silicone films are readily broken when they are elongated. When a silicone film is screen-printed, the film causes no defective printing due to adhesion to a printing plate, but its low film adhesion to ink leads to peeling of cured ink. This is attributed to high silicone peeling property on the surface. On the other hand, a urethane film exhibits high adhesion to ink, thereby causing no peeling of cured ink.

In addition, films using polyurethane with a silicone pendant are excellent in elasticity, strength, and water repellency in a well-balanced manner, but films unfortunately adhere to each other, even to a printing plate during screen-printing due to their film surface tackiness. Polyurethane-based films in which silicone is subjected to block copolymerization on a main chain are not tacky on the film surface, but low in strength.

The development of stretchable films that have high elasticity and strength and no tackiness on the surface, are capable of printing such as screen-printing and peel no ink after printing has been demanded.

Patent Document 2 discloses a proposed skin material for a two-wheeled vehicle seat including a silicone urethane film as a surface film, a urethane film placed underneath and a polyolefinic elastomer film placed further underneath. The silicone urethane film is used on the outermost surface to improve the wear resistance. This technical improvement is derived from silicone's low surface energy that renders the surface non-tacky.

CITATION LIST

Patent Literature

Patent Document 1: Japanese Patent Laid-Open Publication No. 2004-033468
Patent Document 2: Japanese Patent Laid-Open Publication No. 2001-018329

SUMMARY OF INVENTION

Technical Problem

Due to these conventional problems, the development of a self-supporting stretchable film having excellent elasticity and strength equivalent to a polyurethane component and having excellent water repellency equivalent to a silicone component, and further having films' non-stickiness, and a method for forming the same is strongly desired.

The present invention was made in view of the situation to solve the problems, and has an object to provide a stretchable film that has excellent stretchability and strength, with the film surface having excellent water repellency, and a method for forming the same.

Solution to Problem

To solve these problems, the present invention provides a composite stretchable film, the stretchable film including: a surface film which is a cured product of a polyurethane 1 containing a copolymer of one or more of units "a1", "a2", "a3", and "a4", each having polycarbonate or polyester and urethane bonds, and silicone-pendant type urethane units "b1" and/or "b2" represented by the following general formula (1); and an inner film which is a cured product of a polyurethane 2 containing a unit "c" having polyether and urethane bonds represented by the following general formula (2), on which the surface film is laminated:

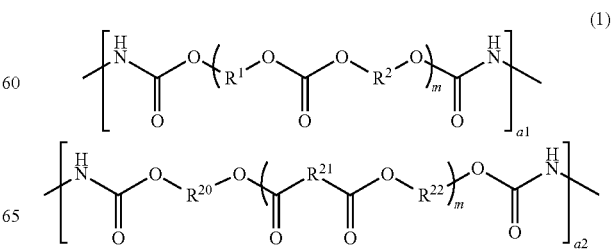

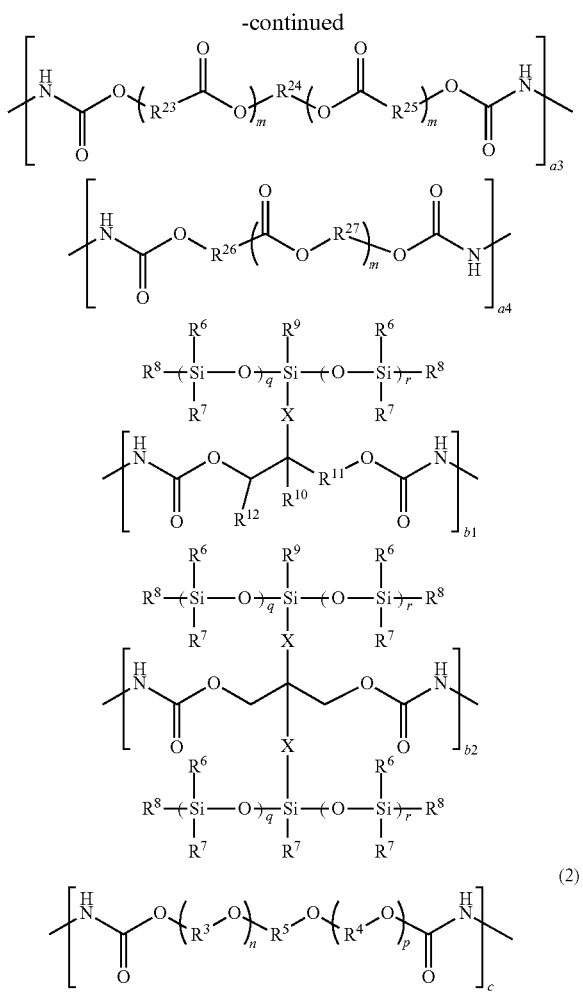

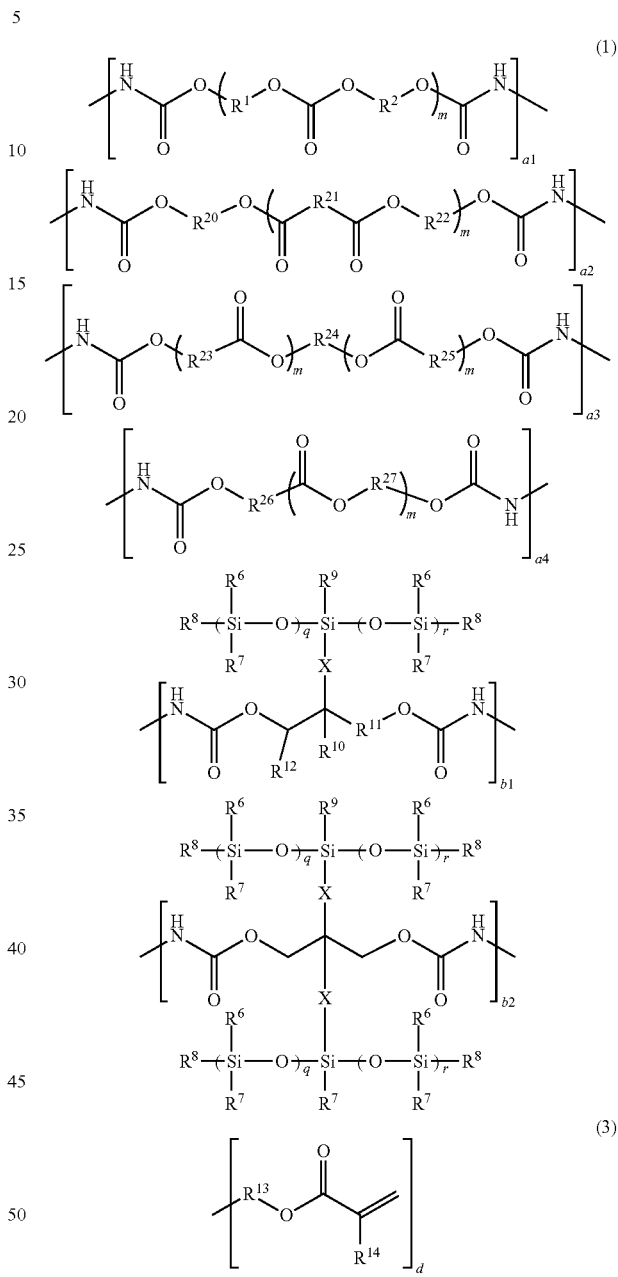

wherein, $R^1$ to $R^4$, and $R^{20}$ to $R^{27}$ represent the same or a different linear or branched alkylene group having 2 to 12 carbon atoms; $R^5$ represents a linear or branched alkylene group having 2 to 20 carbon atoms, or a divalent linking group containing an aromatic group, and optionally containing an ether group, a thiol group, an ester group, a sulfinyl group, a sulfonyl group, a carbonyl group, or a halogen atom; $R^6$, $R^7$, and $R^8$ represent the same or a different linear, branched, or cyclic alkyl group having 1 to 6 carbon atoms, a phenyl group, or a 3,3,3-trifluoropropyl group; $R^9$ represents the same or a different linear, branched, or cyclic alkyl group having 1 to 6 carbon atoms, a phenyl group, a 3,3,3-trifluoropropyl group, or a —(OSiR$^6$R$^7$)$_s$—OSiR$^6$R$^7$R$^8$ group; $R^{10}$ represents a hydrogen atom, or a linear or branched alkyl group having 1 to 4 carbon atoms; $R^{11}$ represents a single bond, a methylene group, or an ethylene group; $R^{12}$ represents a hydrogen atom or a methyl group; X represents a linear or branched alkylene group having 3 to 7 carbon atoms, and optionally containing an ether group; m, n, and p represent an integer of 1 to 200, and q, r, and s represent an integer of 0 to 20; and a1, a2, a3, a4, b1, b2, and c represent a ratio of the repeating unit satisfying inequalities 0≤a1<1.0, 0≤a2<1.0, 0≤a3<1.0, 0≤a4<1.0, 0<a1+a2+a3+a4<1.0, 0≤b1<1.0, 0≤b2<1.0, and 0<b1+b2<1.0 in the polyurethane 1.

The composite stretchable film has excellent stretchability (elasticity) and strength, with the film surface having excellent water repellency.

In this case, the polyurethane 1 can be a polymer having a structure containing a (meth) acrylate group as a terminal group represented by the following general formula (3):

wherein, $R^1$ to $R^{12}$, $R^{20}$ to $R^{27}$, m, n, p, q, r, a1, a2, a3, a4, b1, and b2 represent the same meanings as before; $R^{13}$ represents a linear, branched, or cyclic alkylene group having 1 to 20 carbon atoms, and optionally containing an ether group; $R^{14}$ represents a hydrogen atom or a methyl group; and d represents the number of units in one molecule satisfying an inequality 1≤d≤4.

The polymer containing a (meth) acrylate group is excellent in radical-induced crosslinkability.

The composite stretchable film preferably has a stretching property of 20 to 1000% in a tensile test regulated by JIS K 6251.

With the stretching property, the composite stretchable film can desirably be used as a film coated on a stretchable wire.

The composite stretchable film is preferably used as a film in contact with a conductive wiring having stretchability.

The stretchable film of the present invention can particularly desirably be used for these applications.

The present invention provides a method for forming a composite stretchable film, including:

applying a polyurethane 1 containing a copolymer of one or more of units "a1", "a2", "a3", and "a4", each having polycarbonate or polyester and urethane bonds, and silicone-pendant type urethane units "b1" and/or "b2" represented by the following general formula (1) on an inner film which is a cured product of a polyurethane 2 containing a unit "c" having polyether and urethane bonds represented by the following general formula (2); and curing the polyurethane 1 by heating and/or light exposure to form a surface film:

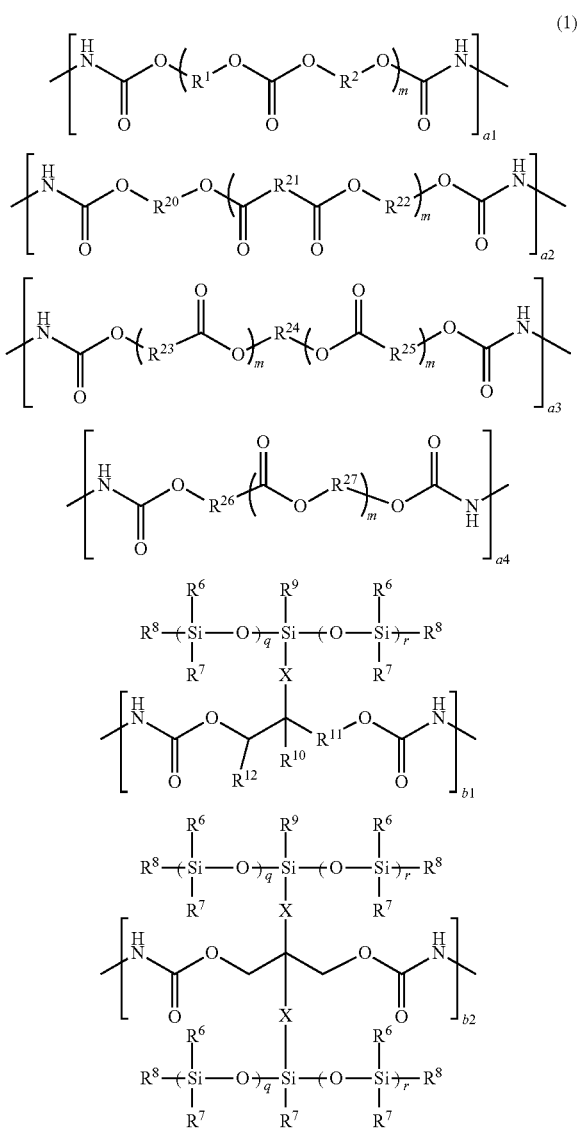

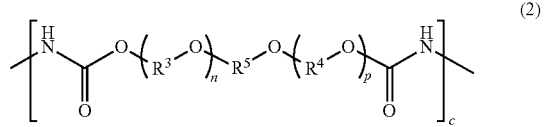

wherein, $R^1$ to $R^4$, and $R^{20}$ to $R^{27}$ represent the same or a different linear or branched alkylene group having 2 to 12 carbon atoms; $R^5$ represents a linear or branched alkylene group having 2 to 20 carbon atoms, or a divalent linking group containing an aromatic group, and optionally containing an ether group, a thiol group, an ester group, a sulfinyl group, a sulfonyl group, a carbonyl group, or a halogen atom; $R^6$, $R^7$, and $R^8$ represent the same or a different linear, branched, or cyclic alkyl group having 1 to 6 carbon atoms, a phenyl group, or a 3,3,3-trifluoropropyl group; $R^9$ represents the same or a different linear, branched, or cyclic alkyl group having 1 to 6 carbon atoms, a phenyl group, a 3,3,3-trifluoropropyl group, or a $-(OSiR^6R^7)_s-$ $OSiR^6R^7R^8$ group; $R^{10}$ represents a hydrogen atom, or a linear or branched alkyl group having 1 to 4 carbon atoms; $R^{11}$ represents a single bond, a methylene group, or an ethylene group; $R^{12}$ represents a hydrogen atom or a methyl group; X represents a linear or branched alkylene group having 3 to 7 carbon atoms, and optionally containing an ether group; m, n, and p represent an integer of 1 to 200, and q, r, and s represent an integer of 0 to 20; and a1, a2, a3, a4, b1, b2, and c represent a ratio of the repeating unit satisfying inequalities $0 \leq a1 < 1.0$, $0 \leq a2 < 1.0$, $0 \leq a3 < 1.0$, $0 \leq a4 < 1.0$, $0 < a1+a2+a3+a4 < 1.0$, $0 \leq b1 < 1.0$, $0 \leq b2 < 1.0$, and $0 < b1+b2 < 1.0$ in the polyurethane 1.

The method for forming a stretchable film can readily form a composite stretchable film having excellent stretchability, strength, and water repellency on the film surface.

Also, in the method for forming a stretchable film, the polyurethane 2 can be applied on a substrate and cured by heating and/or light exposure to form the inner film.

The method for forming a stretchable film can more readily form a composite stretchable film having excellent stretchability, strength, and water repellency on the film surface.

Advantageous Effects of Invention

As described above, the composite stretchable film of the present invention is excellent in stretchability (elasticity) and strength equivalent to a polyurethane component and its film surface has excellent water repellency equivalent to or more desirable than silicone whose main chain is a siloxane bond, and non-sticky feeling on the surface. As in the present invention, a composite stretchable film in which a silicone-pendant type polyurethane-based layer containing polycarbonate or polyester is formed on the surface of a polyurethane-based layer containing polyether can form a film having high stretchability, strength, water repellent, and non-sticky feeling on the surface. Such a composite stretchable wire film obtained by bringing the stretchable film of the present invention in contact with a conductive wire and coating either or both faces of a conductive wire is excellent not only in stretchability and strength, but also in water repellency and favorable skin feeling due to non-sticky feeling on the surface. Accordingly, the stretchable film of the present invention can particularly desirably be used as a stretchable film capable of mounting not only a wiring part for connecting a bio-electrode and a sensor, but also other essential parts of a bio-electrode and a sensor in wearable devices. Also, the method for forming a stretchable film of the present invention can readily form the above-mentioned composite stretchable film.

DESCRIPTION OF EMBODIMENTS

Figure 1:
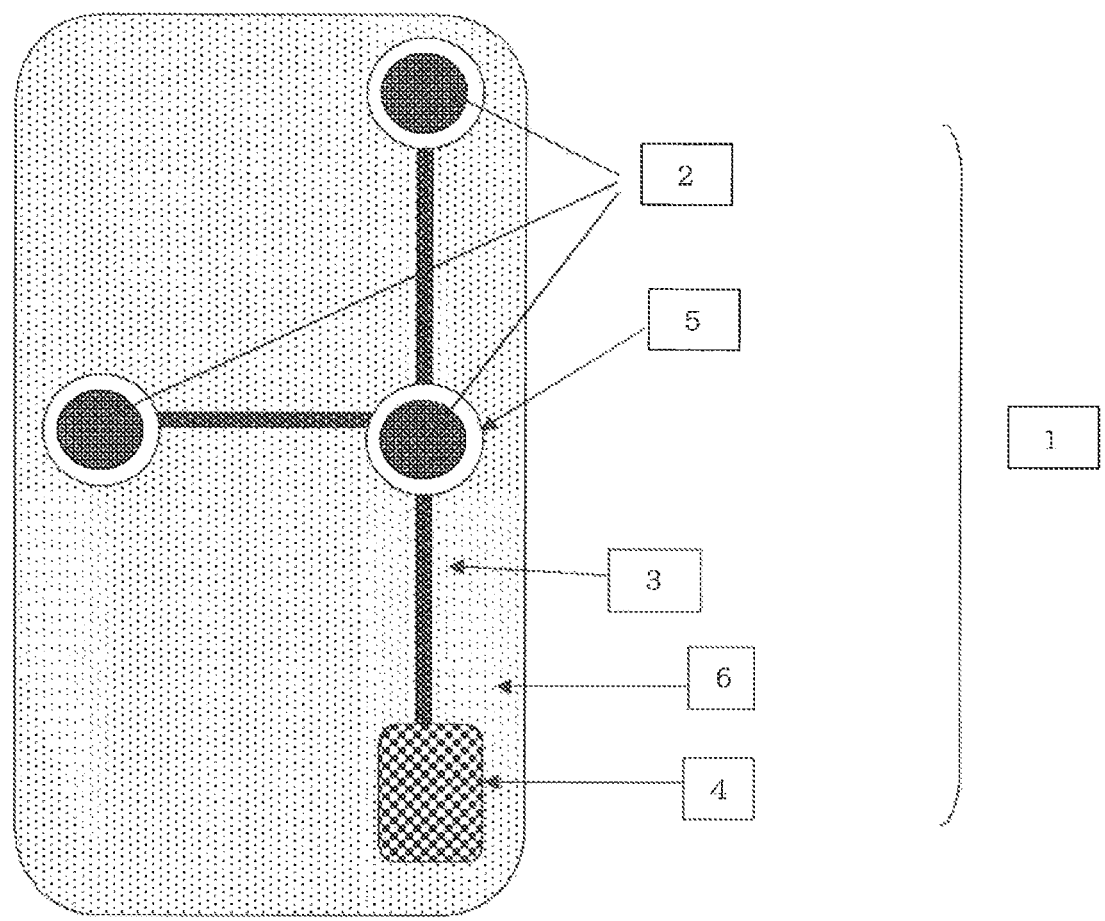
FIG. 1 is a schematic illustration of an electrocardiograph formed on a composite stretchable film of the present invention viewed from the bio-electrode side.

Polyurethane has sufficient elasticity and strength, but also low water repellency, but hydrolysis unfortunately lowers its strength and elasticity, while silicone has high water repellency but also low strength. In addition, a cured product of a silicone urethane polymer having both a urethane bond and a siloxane bond on a main chain is excellent in water repellency with weak sticky feeling on the film surface but also low strength, while a film based on polyurethane having polyether and silicone-pendant on a side chain has high strength, elasticity, and water repellent but has a drawback of tackiness on the surface. Under the circumstances, the development of a stretchable film having excellent elasticity and strength equivalent to a polyurethane component and sufficiently high film surface strength, and having excellent water repellency and surface hardness equivalent to or more desirable than a silicone component, and a method for forming the same, has been demanded.

In a repetitive stretching test for a sheet using polyurethane containing polyether as a soft segment, the stress increases in proportion to the degree of extension during elongation, decreases during shrinkage, and returns to 0 when the degree of extension is 0%. The test found that the degree of extension and the stress have a linear relationship, and the sheet is excellent in hysteresis of elasticity and stress. Meanwhile, in a repetitive stretching test for a sheet using polyurethane containing polycarbonate or polyester as a soft segment, the stress significantly increases at the onset of elongation, and thereafter the gradient in stress increase is gentle, resulting in "yield point". Shrinkage causes abrupt stress decrease, and subsequently no stress prior to 0% elongation. When the degree of extension is 0%, the sheet remains elongated and never returns to the original state.

Even in another repetitive stretching test for a sheet using polyurethane containing a soft segment obtained by copolymerizing polyether and polycarbonate or polyester, the hysteresis is unfavorable although it is not so much as a case where a soft segment only composed of polycarbonate or polyester is used.

Inventors of the present invention have carried out an extended investigation and found that by forming side chain silicone polycarbonate or polyester type polyurethane layer having low elasticity but high strength, high water repellent and non-tacky surface on a surface of a film based on polyether type polyurethane having high elasticity and strength, favorable hysteresis during elongation and tackiness on the surface to prepare a composite film, the resulting excellent non-sticky stretchable film having high elasticity, strength, and water repellency, and non-sticky feeling on the surface can be provided as a particularly desirable elastic substrate film for forming an elastic wire in wearable devices. Based on that information, the present invention was accomplished.

Specifically, the present invention provides a stretchable film comprising: a surface film which is a cured product of a polyurethane 1 containing a copolymer of one or more of units "a1", "a2", "a3", and "a4", each having polycarbonate or polyester and urethane bonds, and silicone-pendant type urethane units "b1" and/or "b2" represented by the following general formula (1); and an inner film which is a cured product of a polyurethane 2 containing a unit "c" having polyether and urethane bonds represented by the following general formula (2), on which the surface film is laminated:

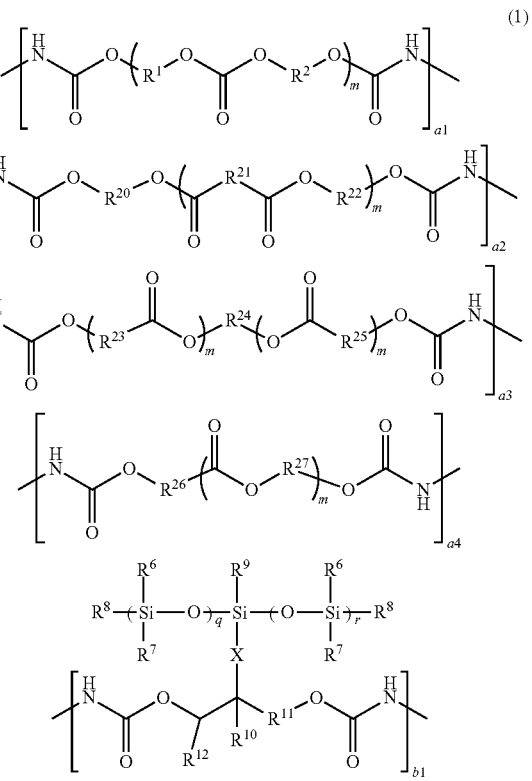

-continued

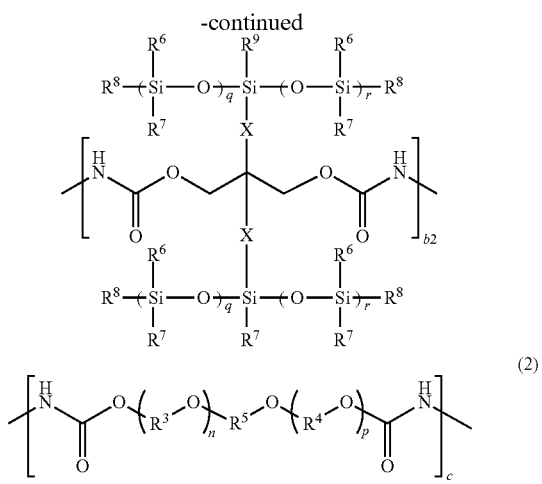

(2)

wherein, $R^1$ to $R^4$, and $R^{20}$ to $R^{27}$ represent the same or a different linear or branched alkylene group having 2 to 12 carbon atoms; $R^5$ represents a linear or branched alkylene group having 2 to 20 carbon atoms, or a divalent linking group containing an aromatic group, and optionally containing an ether group, a thiol group, an ester group, a sulfinyl group, a sulfonyl group, a carbonyl group, or a halogen atom; $R^6$, $R^7$, and $R^8$ represent the same or a different linear, branched, or cyclic alkyl group having 1 to 6 carbon atoms, a phenyl group, or a 3,3,3-trifluoropropyl group; $R^9$ represents the same or a different linear, branched, or cyclic alkyl group having 1 to 6 carbon atoms, a phenyl group, a 3,3,3-trifluoropropyl group, or a $—(OSiR^6R^7)_s—OSiR^6R^7R^8$ group; $R^{10}$ represents a hydrogen atom, or a linear or branched alkyl group having 1 to 4 carbon atoms; $R^{11}$ represents a single bond, a methylene group, or an ethylene group; $R^{12}$ represents a hydrogen atom or a methyl group; X represents a linear or branched alkylene group having 3 to 7 carbon atoms, and optionally containing an ether group; m, n, and p represent an integer of 1 to 200, and q, r, and s represent an integer of 0 to 20; and a1, a2, a3, a4, b1, b2, and c represent a ratio of the repeating unit satisfying inequalities $0 \leq a1 < 1.0$, $0 \leq a2 < 1.0$, $0 \leq a3 < 1.0$, $0 \leq a4 < 1.0$, $0 < a1+a2+a3+a4 < 1.0$, $0 \leq b1 \leq 1.0$, $0 \leq b2 < 1.0$, and $0 < b1+b2 < 1.0$ in the polyurethane 1.

The present invention will be described in detail, but the present invention is not restricted thereto.

<Stretchable Film>

A stretchable film of the present invention is obtained by laminating a surface film which is a cured product of a polyurethane 1 containing a copolymer of one or more of units "a1", "a2", "a3", and "a4", each having polycarbonate or polyester and urethane bonds, and silicone-pendant type urethane units "b1" and/or "b2" on an inner film which is a cured product of a polyurethane 2 containing a unit "c" having polyether and urethane bonds. By forming a surface film (layer) which is side chain silicone polycarbonate and/or polyester type polyurethane having low elasticity but high strength and water repellency, and non-tackiness on the surface on a surface of an inner film based on polyether type polyurethane having high elasticity and strength, favorable hysteresis during elongation and tackiness on the surface to prepare a composite film, an excellent non-sticky stretchable film having high elasticity, strength, water repellency, and non-sticky feeling on the surface can be provided.

The polyurethanes 1 and 2 that provide a surface film, an inner film, and each film (layer) will be described. The units "a1", "a2", "a3", and "a4" are also collectively called "unit "a"" or ""a" unit".

[Surface Film]

A surface film is formed on the surface (upward of an inner film) of the stretchable film of the present invention. The surface film (i.e., polycarbonate and/or polyester silicone-pendant type polyurethane layer) is a cured product of a polyurethane 1 having a structure having one or more of units "a1" to "a4" and units "b1" and/or "b2" represented by the following general formula (1).

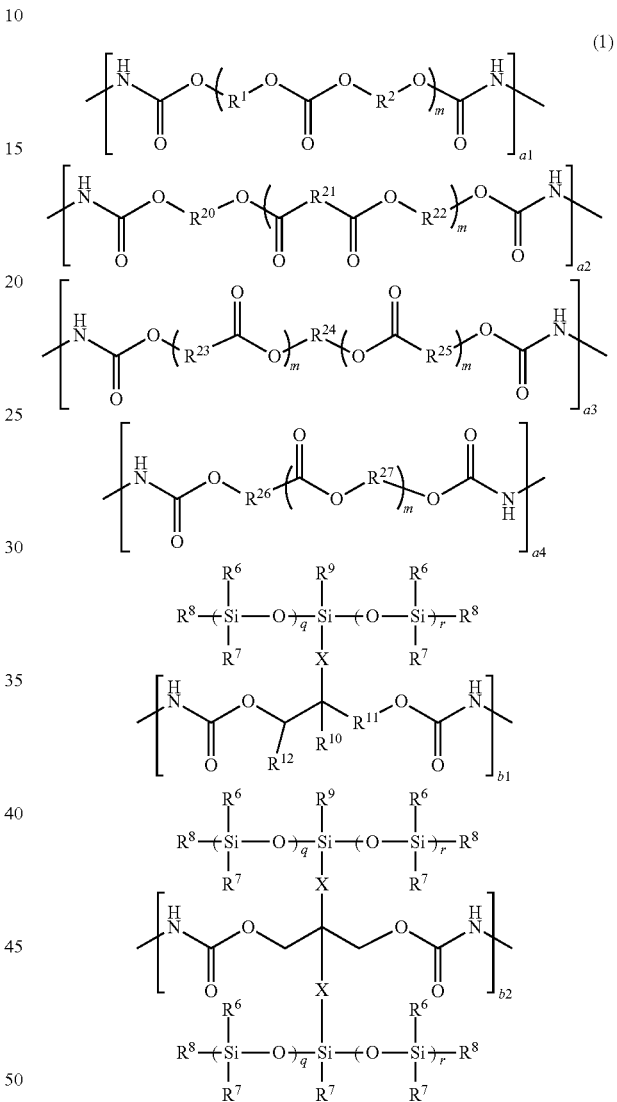

(1)

wherein, $R^1$ to $R^4$, and $R^{20}$ to $R^{27}$ represent the same or a different linear or branched alkylene group having 2 to 12 carbon atoms; $R^5$ represents a linear or branched alkylene group having 2 to 20 carbon atoms, or a divalent linking group containing an aromatic group, and optionally containing an ether group, a thiol group, an ester group, a sulfinyl group, a sulfonyl group, a carbonyl group, or a halogen atom; $R^6$, $R^7$, and $R^8$ represent the same or a different linear, branched, or cyclic alkyl group having 1 to 6 carbon atoms, a phenyl group, or a 3,3,3-trifluoropropyl group; $R^9$ represents the same or a different linear, branched, or cyclic alkyl group having 1 to 6 carbon atoms, a phenyl group, a 3,3,3-trifluoropropyl group, or a $—(OSiR^6R^7)_s—OSiR^6R^7R^8$ group; $R^{10}$ represents a hydrogen atom, or a linear or branched alkyl group having 1 to 4 carbon atoms;

$R^{11}$ represents a single bond, a methylene group, or an ethylene group; $R^{12}$ represents a hydrogen atom or a methyl group; X represents a linear or branched alkylene group having 3 to 7 carbon atoms, and optionally containing an ether group; m, n, and p represent an integer of 1 to 200, and q, r, and s represent an integer of 0 to 20; and a1, a2, a3, a4, b1, b2, and c represent a ratio of the repeating unit satisfying inequalities $0 \leq a1 < 1.0$, $0 \leq a2 < 1.0$, $0 \leq a3 < 1.0$, $0 \leq a4 < 1.0$, $0 < a1+a2+a3+a4 < 1.0$, $0 b1 < 1.0$, $0 \leq b2 < 1.0$, and $0 < b1+b2 < 1.0$ in the polyurethane 1.

Preferably, the polyurethane 1 is a polymer having a structure containing a (meth) acrylate group as a terminal group represented by the following general formula (3).

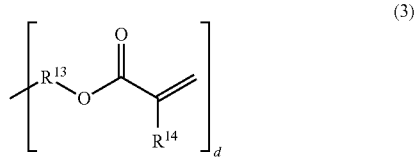

(3)

wherein, $R^{13}$ represents a linear, branched, or cyclic alkylene group having 1 to 20 carbon atoms, and optionally containing an ether group; $R^{14}$ represents a hydrogen atom or a methyl group; and d represents the number of units in one molecule satisfying an inequality $1 \leq d \leq 4$.

The polymer containing a (meth) acrylate group can readily be crosslinked (cured) by allowing the polymer to react with a radical by heating or light exposure.

A compound containing a (meth) acrylate group as a terminal group represented by the general formula (3) can be obtained by allowing an isocyanate compound having a (meth) acrylate group to react with a diol compound having a silicon-containing group, a polycarbonate compound or a polyester compound mentioned later. Also, a compound having the (meth) acrylate group can be obtained by allowing a compound containing a (meth) acrylate group having a hydroxyl group to react with an isocyanate compound.

[Polyurethane 1]

A polyurethane 1 is polyurethane having a structure represented by one or more of units "a1" to "a4" and units "b1" and/or "b2" in the general formula (1), and corresponds to a copolymer of one or more of the units "a1" to "a4", each having polycarbonate or polyester and urethane bonds, and silicone-pendant type urethane units "b1" and/or "b2" represented by the general formula (1). The polyurethane 1 may be polyurethane containing the above-mentioned structure, and can include other structures.

$R^1$, $R^2$, and $R^{20}$ to $R^{27}$ in a repeating unit "a" represent the same or a different linear or branched alkylene group having 2 to 12 carbon atoms. Illustrative example of the alkylene group includes an ethylene group, a n-propylene group, an isopropylene group, a n-butylene group, an isobutylene group, a sec-butylene group, a tert-butylene group, a n-pentylene group, a 1-methyl-n-butylene group, a 2-methyl-n-butylene group, a 3-methyl-n-butylene group, a 1,1-dimethyl-n-propylene group, a 1,2-dimethyl-n-propylene group, a 2,2-dimethyl-n-propylene group, a 1-ethyl-n-propylene group, a n-hexylene group, a 1-methyl-n-pentylene group, a 2-methyl-n-pentylene group, a 3-methyl-n-pentylene group, a 4-methyl-n-pentylene group, a 1,1-dimethyl-n-butylene group, a 1,2-dimethyl-n-butylene group, a 1,3-dimethyl-n-butylene group, a 2,2-dimethyl-n-butylene group, a 2,3-dimethyl-n-butylene group, a 3,3-dimethyl-n-butylene group, a 1-ethyl-n-butylene group, and a 2-ethyl-n-butylene group.

In addition, the repeating unit "a" may be one of units "a1" to "a4", or a combination of two or more units, or the unit "a1" (polycarbonate) and the units "a2" to "a4" (polyester) may be combined. The elasticity and strength of a stretchable film obtained by combining a soft segment of polycarbonate and a soft segment of polyester can be enhanced.

In order to obtain polycarbonate-containing polyurethane in the repeating unit "a1", the following polycarbonate compounds having diol as a terminal group can be employed as a raw material.

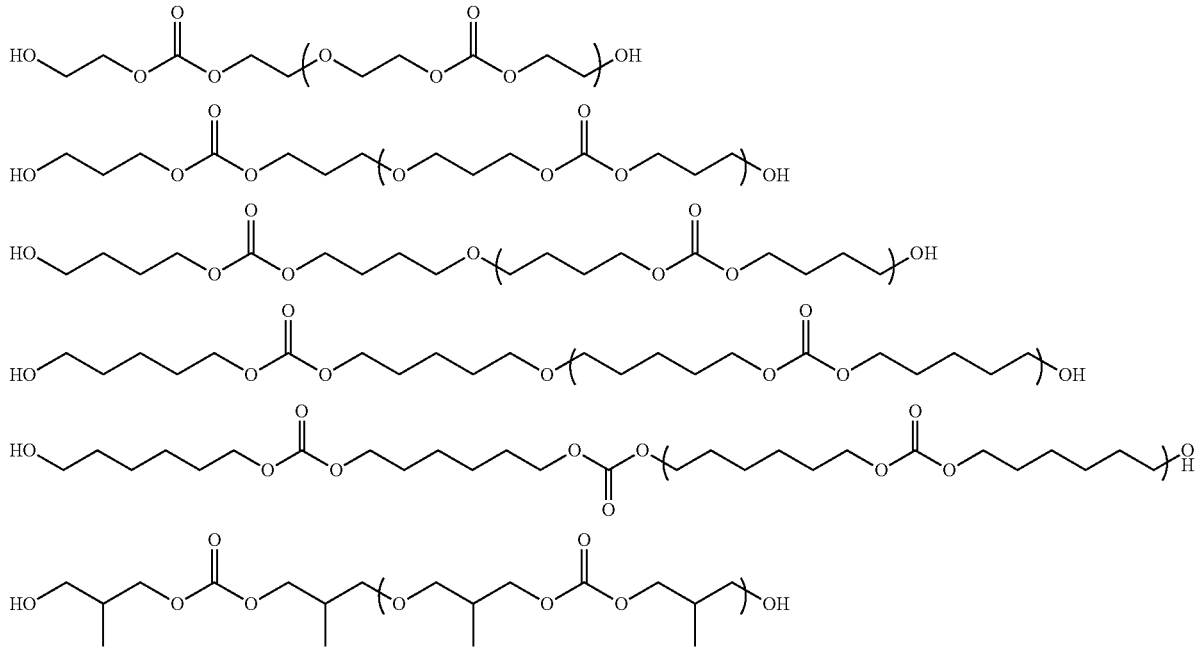

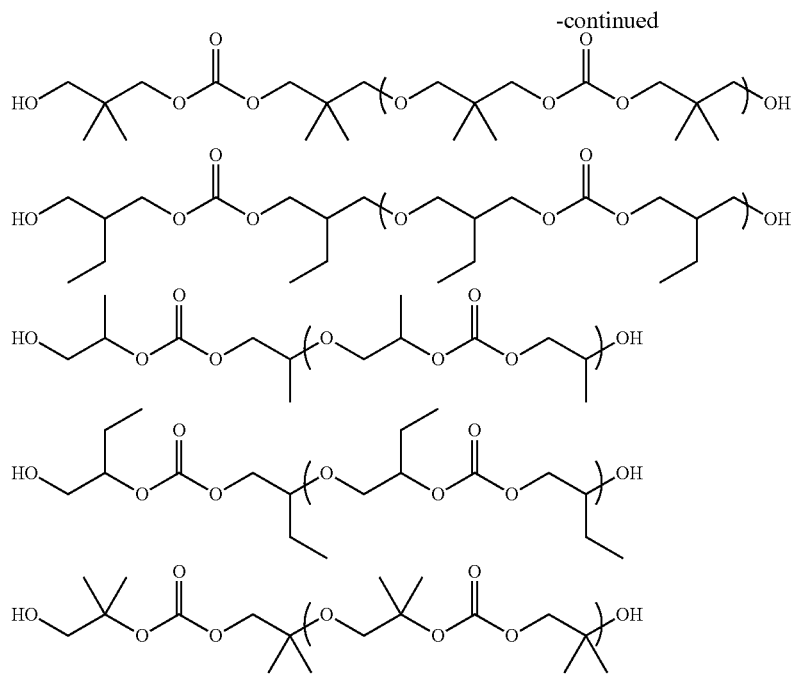

Herein, the repeating unit in parentheses represents m.

Diol compounds using a polyester compound having diol as a terminal group for obtaining a soft segment "a2" (unit "a2") of copolymerizable polyester as a raw material can be illustrated as follows.

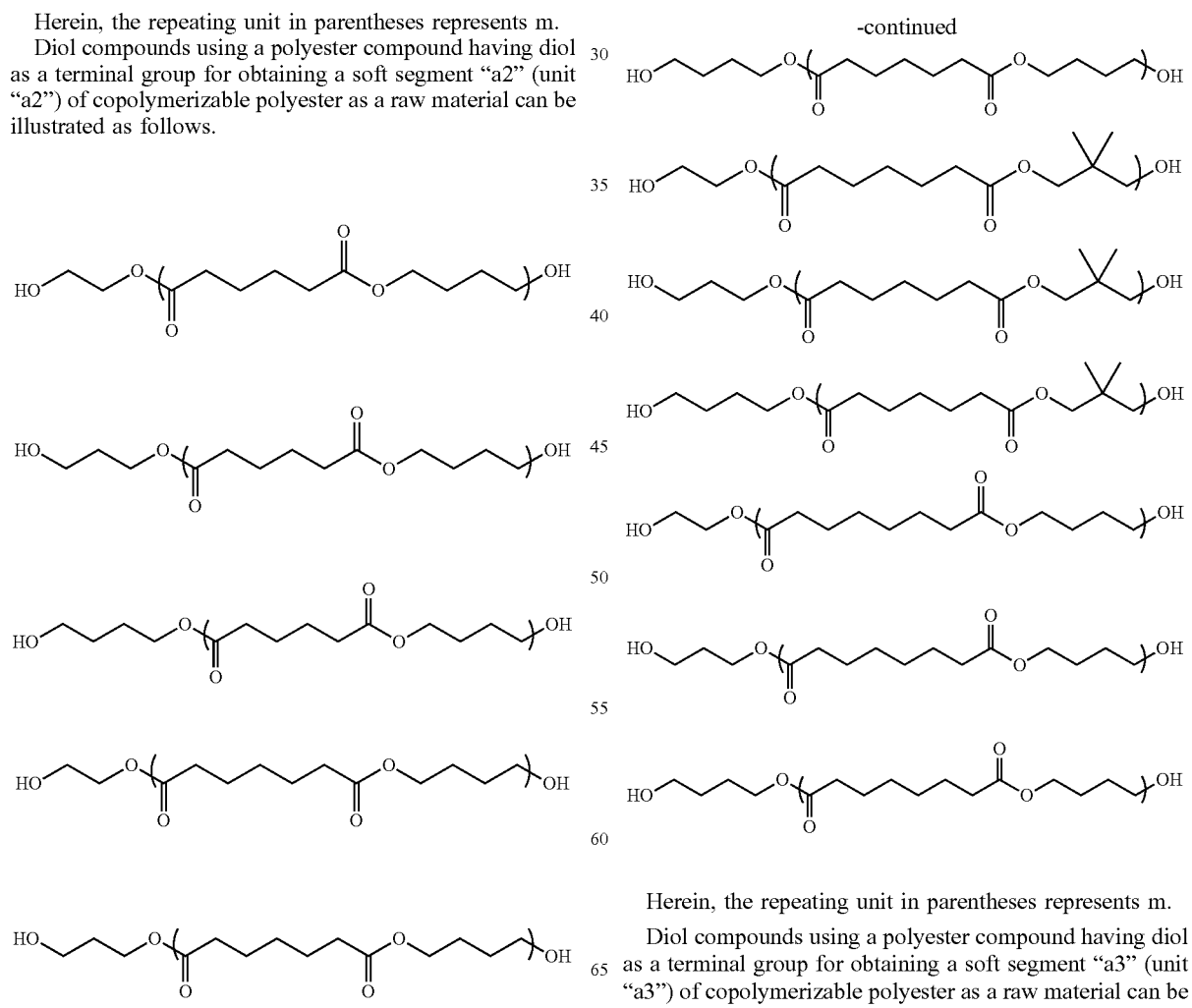

Herein, the repeating unit in parentheses represents m.

Diol compounds using a polyester compound having diol as a terminal group for obtaining a soft segment "a3" (unit "a3") of copolymerizable polyester as a raw material can be illustrated as follows.

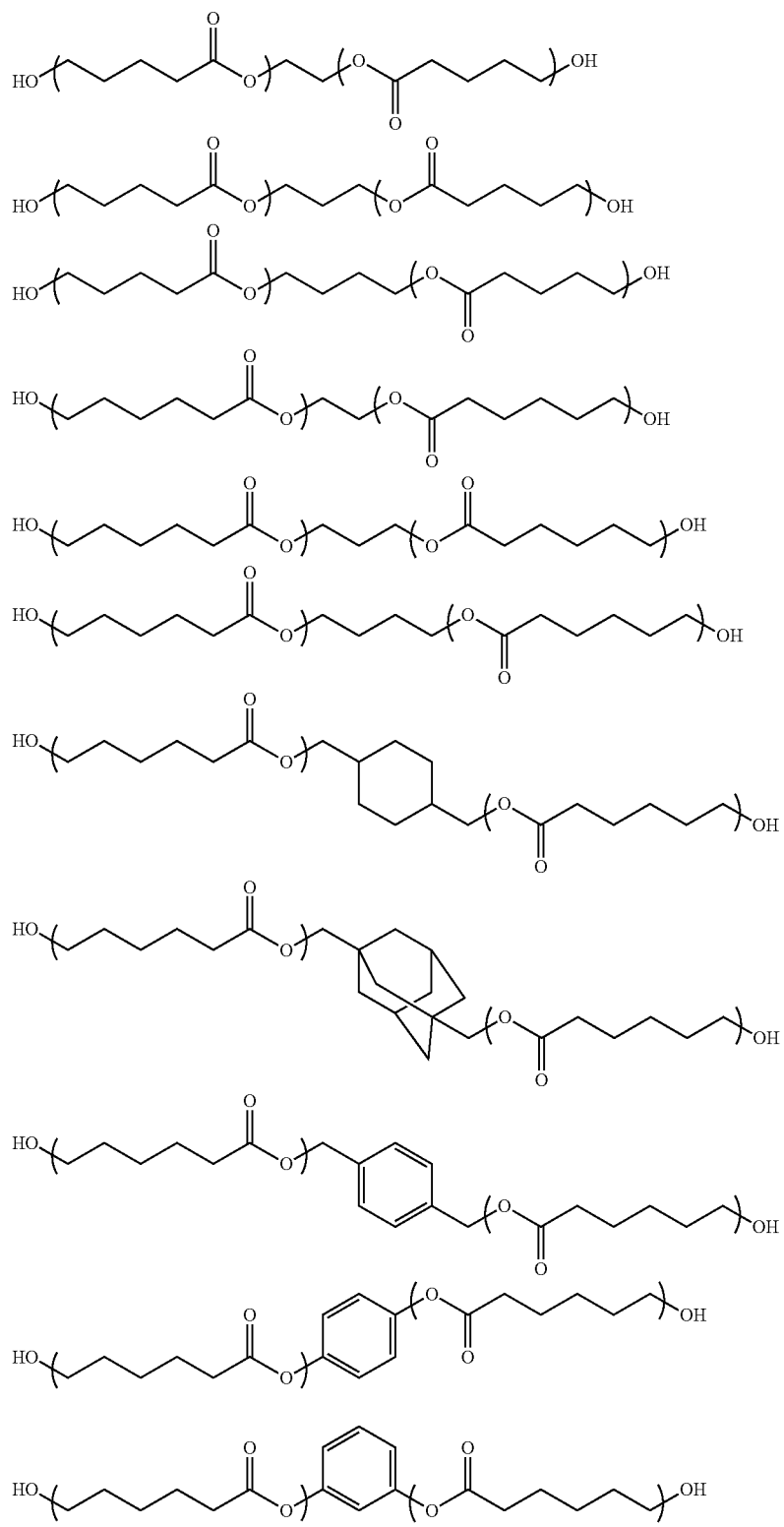
Herein, the repeating unit in parentheses represents m.
Diol compounds using a polyester compound having diol as a terminal group for obtaining a soft segment "a4" (unit "a4") of copolymerizable polyester as a raw material can be illustrated as follows.
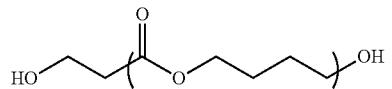

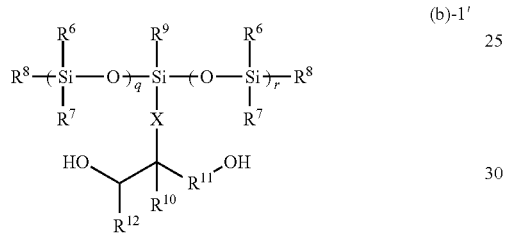

Herein, the repeating unit in parentheses represents m.

Illustrative example of the diol compound for forming a structure represented by "b1" in the general formula (1) can include a compound represented by the following general formula (b)-1'.

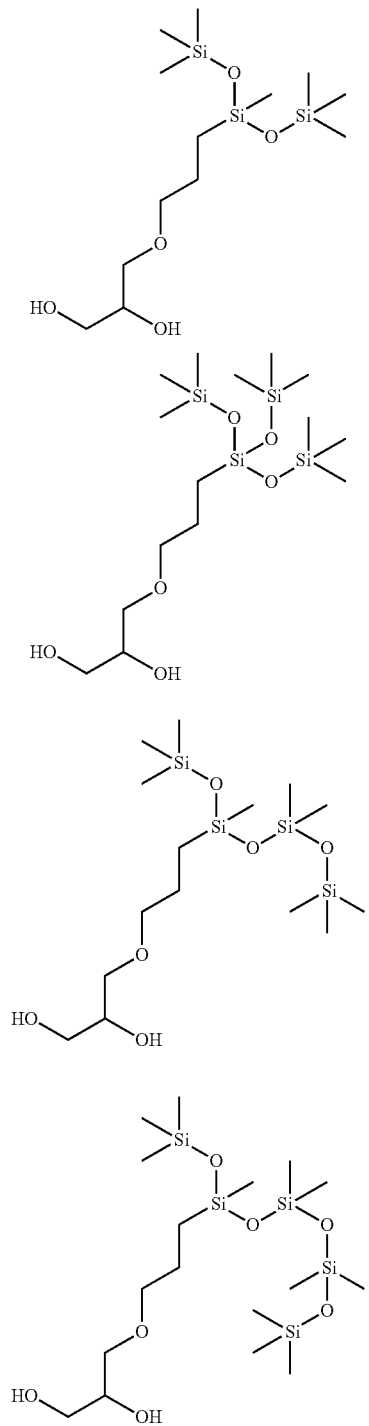

(b)-1'

$R^6$, $R^7$, and $R^8$ represent the same or a different linear, branched, or cyclic alkyl group having 1 to 6 carbon atoms, a phenyl group, or a 3,3,3-trifluoropropyl group. Illustrative example thereof includes a methyl group, an ethyl group, a n-propyl group, an isopropyl group, a n-butyl group, an isobutyl group, a tert-butyl group, a n-pentyl group, a cyclopentyl group, a n-hexyl group, a dyclohexyl group, a phenyl group, and a 3,3,3-trifluoropropyl group.

$R^9$ represents the same or a different linear, branched, or cyclic alkyl group having 1 to 6 carbon atoms, a phenyl group, a 3,3,3-trifluoropropyl group, or a $-(OSiR^6R^7)_s-$ $OSiR^6R^7R^8$ group. s represents an integer of 0 to 20.

$R^{10}$ represents a hydrogen atom, or a linear or branched alkyl group having 1 to 4 carbon atoms. Illustrative example thereof includes a methyl group, an ethyl group, a n-propyl group, an isopropyl group, a n-butyl group, an isobutyl group, and a tert-butyl group. $R^{11}$ represents a single bond, a methylene group, or an ethylene group; $R^{12}$ represents a hydrogen atom or a methyl group; X represents a linear or branched alkylene group having 3 to 7 carbon atoms, and may contain an ether group. Illustrative example of the X includes a n-propylene group, an isopropylene group, a n-butylene group, an isobutylene group, a sec-butylene group, a tert-butylene group, a n-pentylene group, a 1-methyl-n-butylene group, a 2-methyl-n-butylene group, a 3-methyl-n-butylene group, a 1,1-dimethyl-n-propylene group, a 1,2-dimethyl-n-propylene group, a 2,2-dimethyl-n-propylene group, a 1-ethyl-n-propylene group, a n-hexylene group, a 1-methyl-n-pentylene group, a 2-methyl-n-pentylene group, a 3-methyl-n-pentylene group, a 4-methyl-n-pentylene group, a 1,1-dimethyl-n-butylene group, a 1,2-dimethyl-n-butylene group, a 1,3-dimethyl-n-butylene group, a 2,2-dimethyl-n-butylene group, a 2,3-dimethyl-n-butylene group, a 3,3-dimethyl-n-butylene group, a 1-ethyl-n-butylene group, and a 2-ethyl-n-butylene group. q and r represent an integer of 0 to 20.

A diol compound having a pendant short-chain silicone represented by the general formula (b)-1' can be obtained by allowing e.g., glycerin monoallyl ether to react with a short-chain siloxane compound having a SiH group under a platinum catalyst. Illustrative example thereof includes the following compounds.

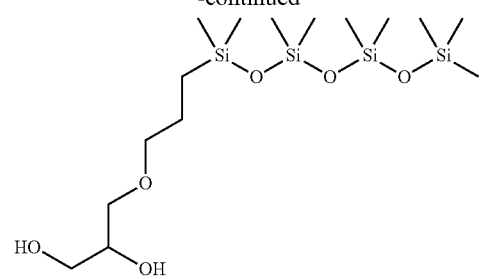
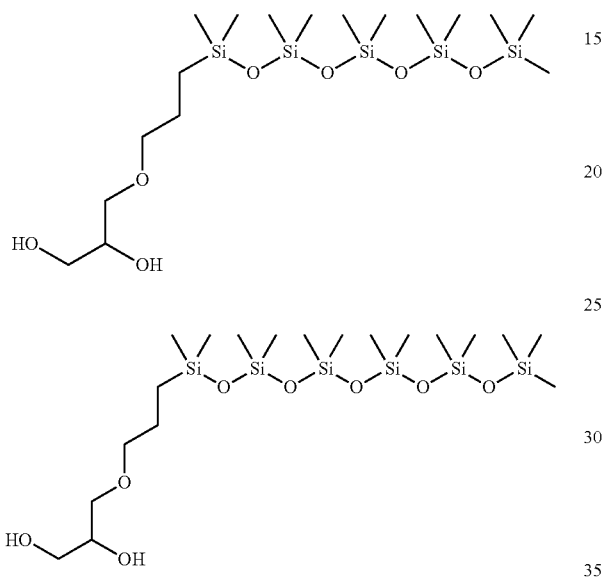
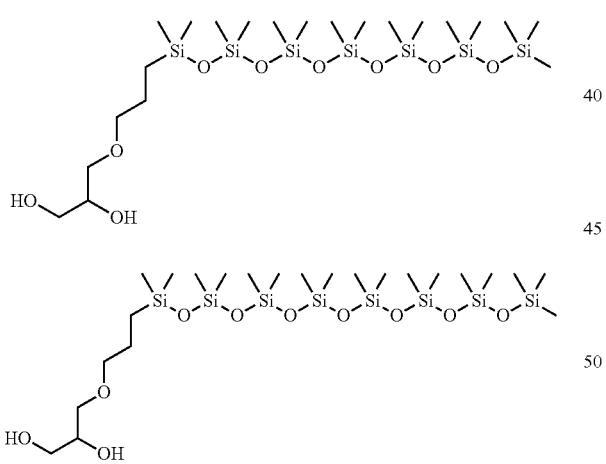
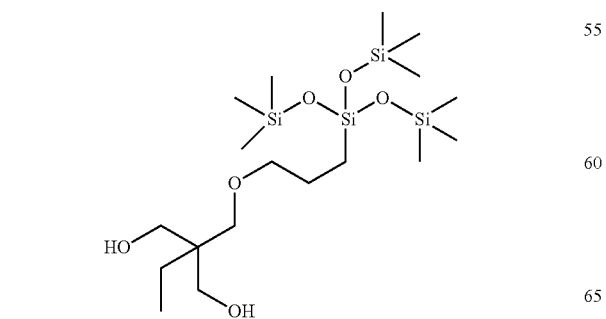
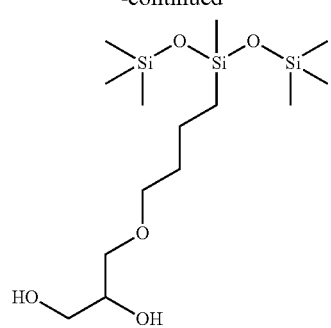
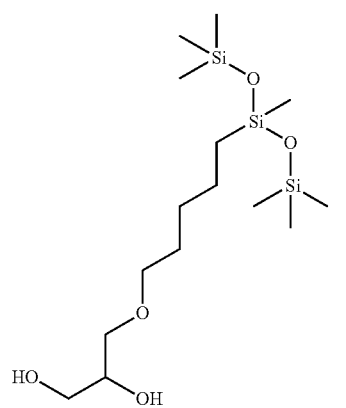
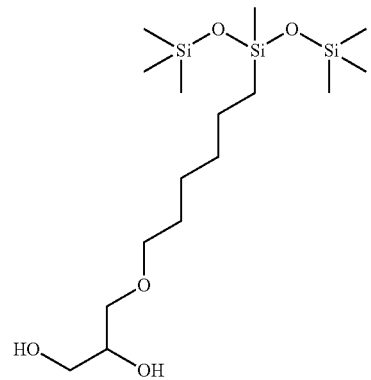
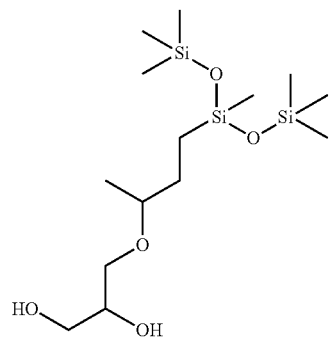

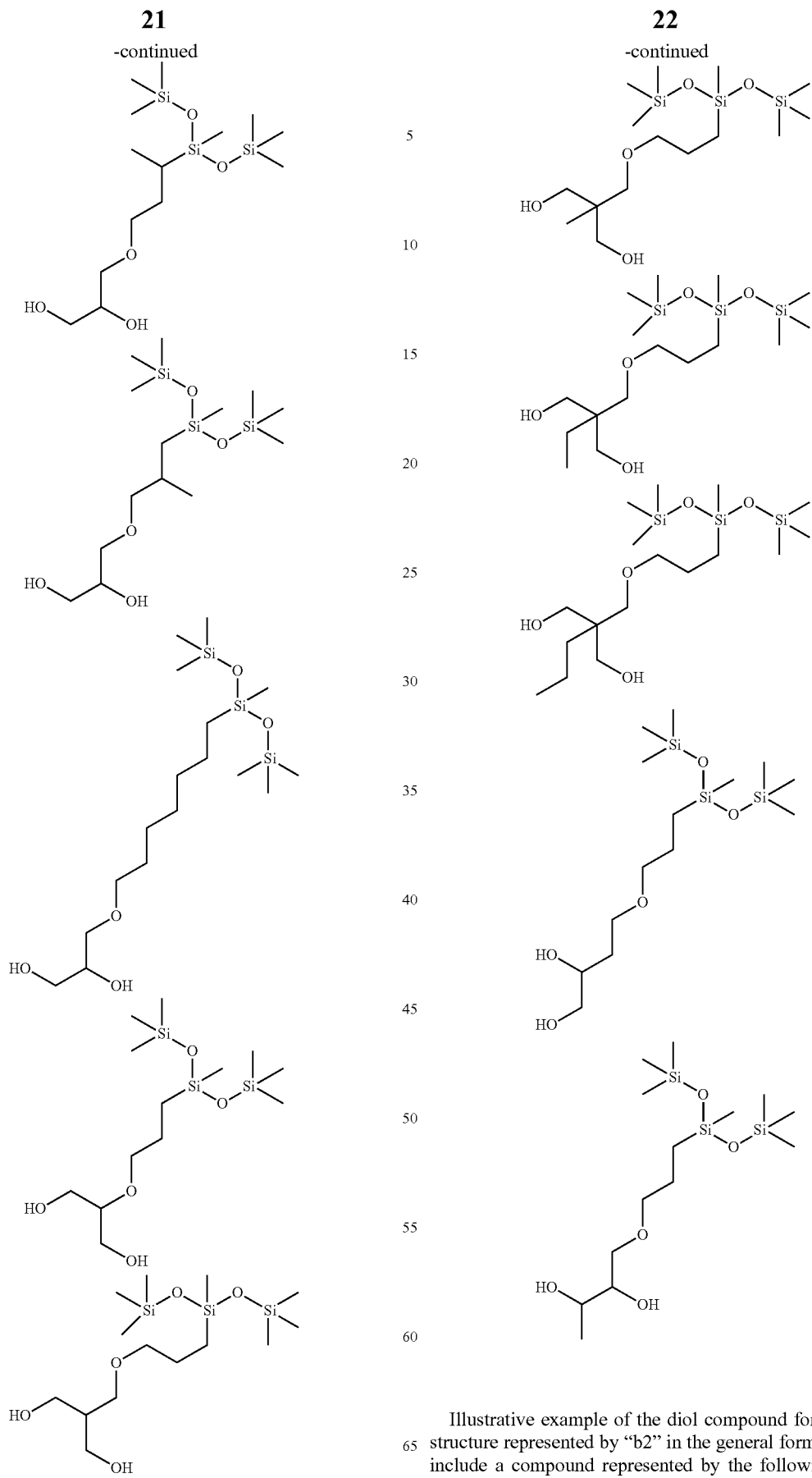
Illustrative example of the diol compound for forming a structure represented by "b2" in the general formula (1) can include a compound represented by the following general formula (b)-2'.

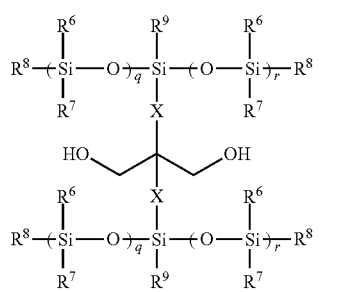
(b)-2' wherein, $R^6$ to $R^9$, and X represent the same meanings as before.

A diol compound having a pendant short-chain silicone represented by general formula (b)-2' can be obtained by allowing e.g., a dihydroxydialkenyl compound to react with a short-chain siloxane compound having a SiR group under a platinum catalyst. Illustrative example thereof includes the following compounds.

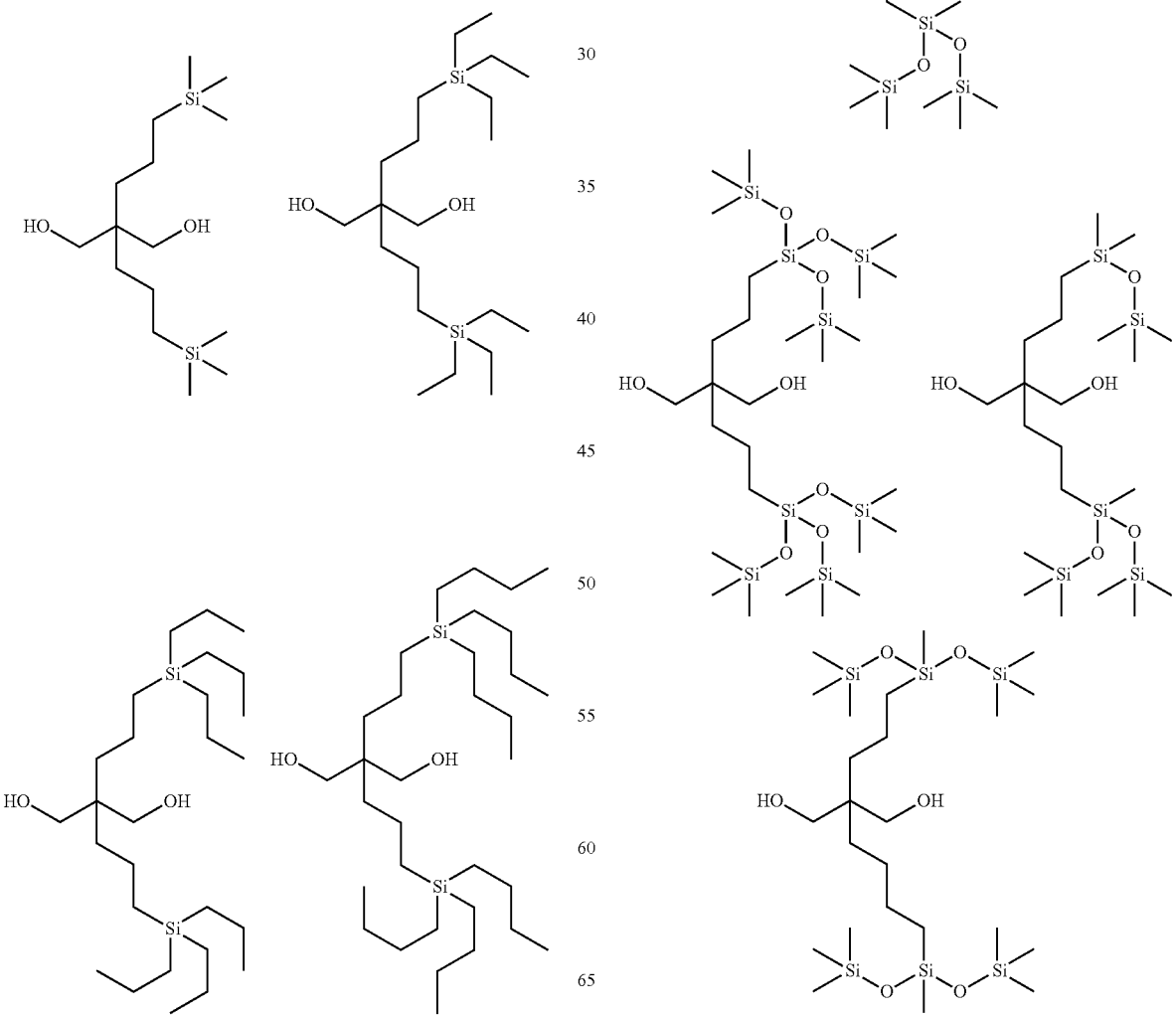

-continued
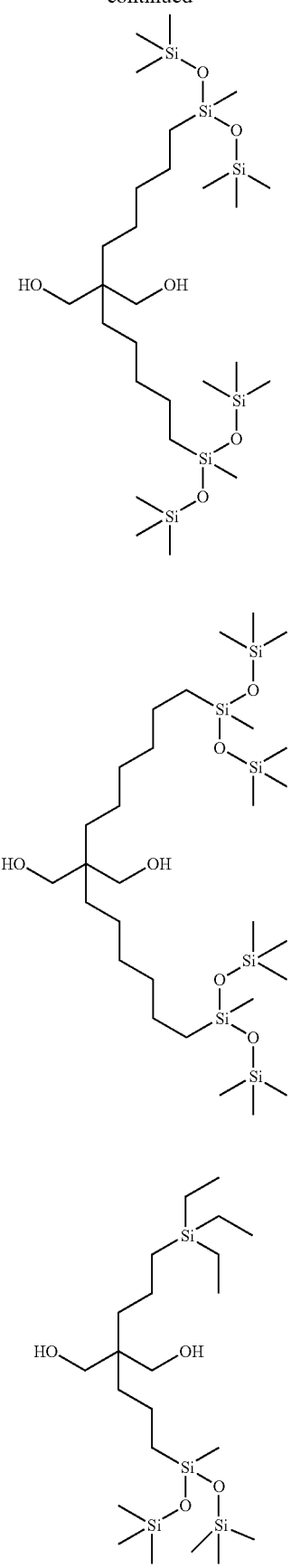
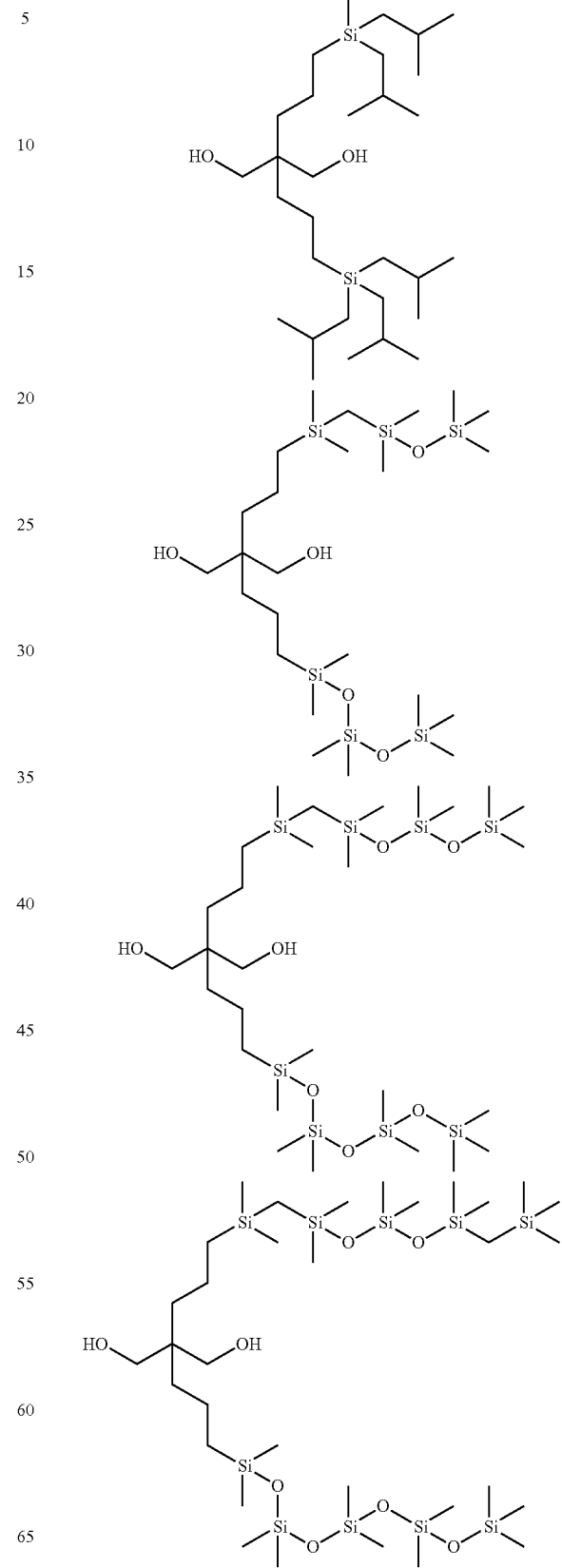

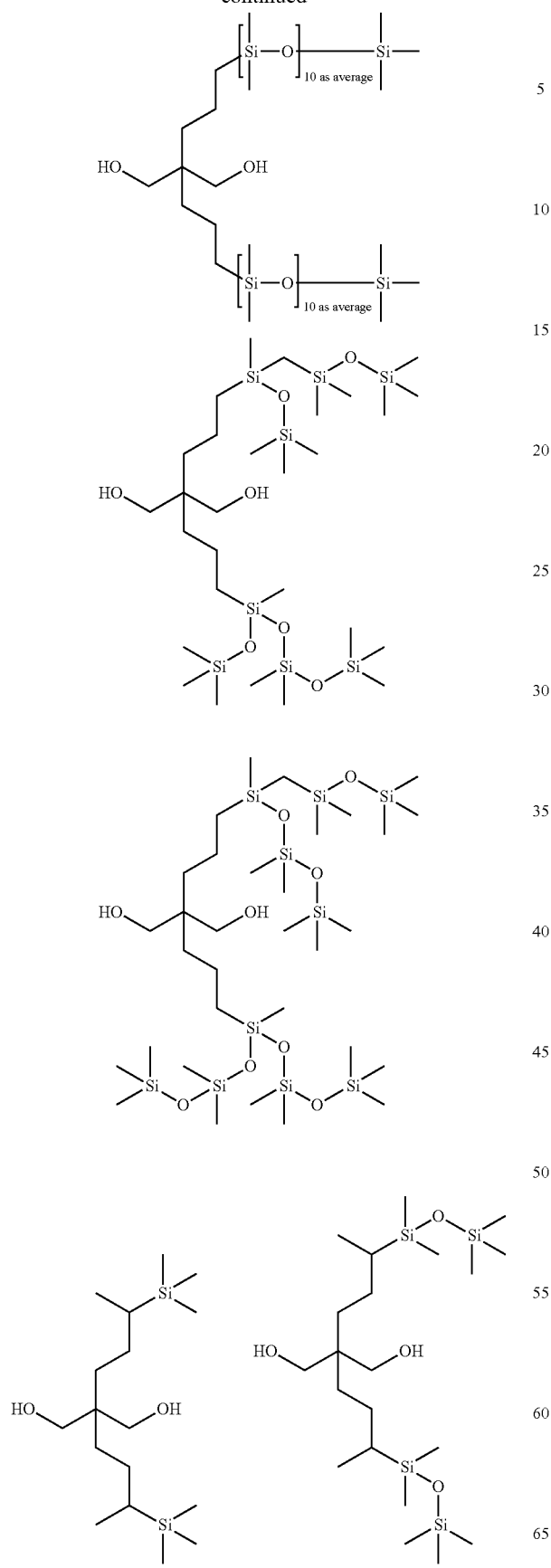
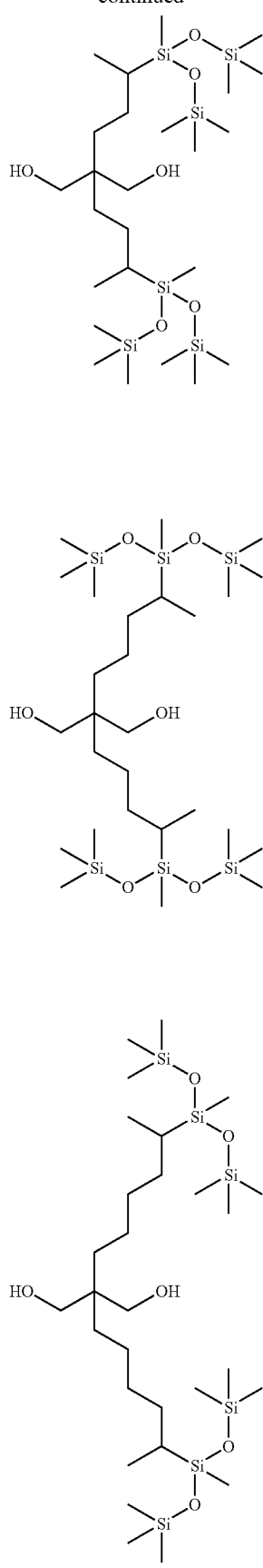

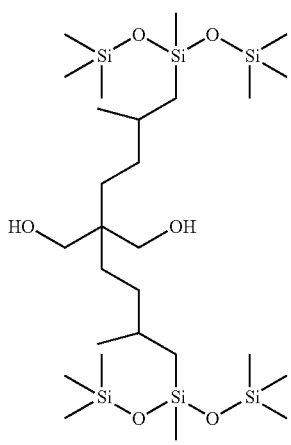
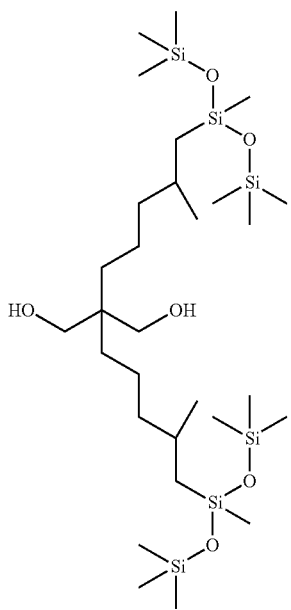
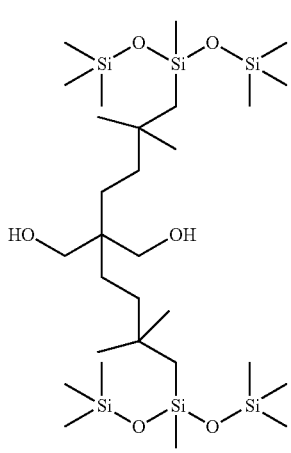
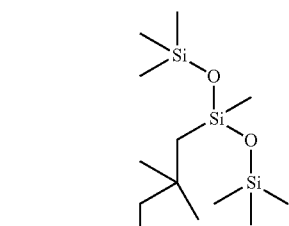
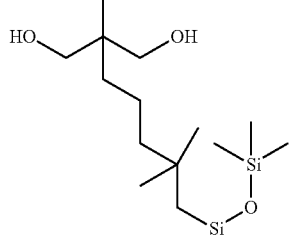
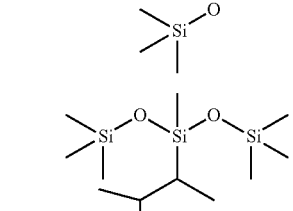
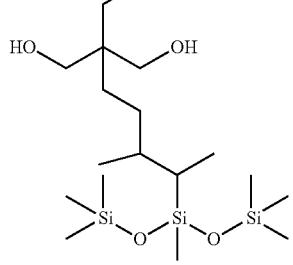
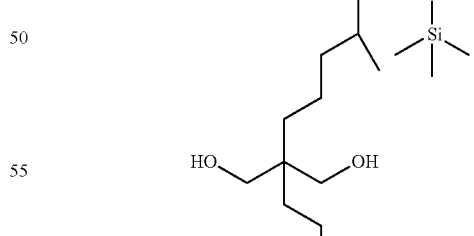
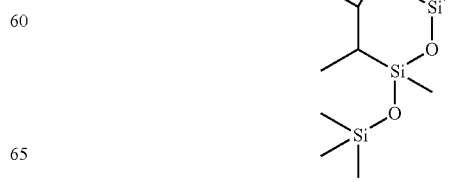

31
-continued
32
-continued
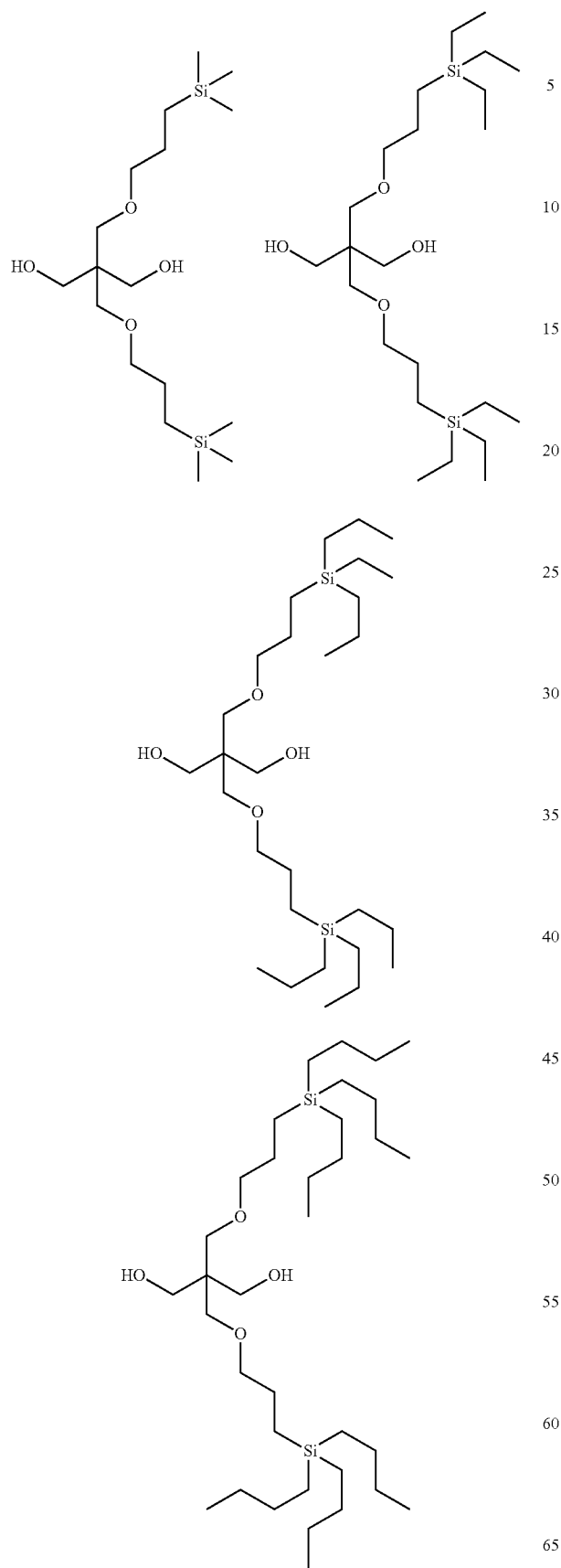

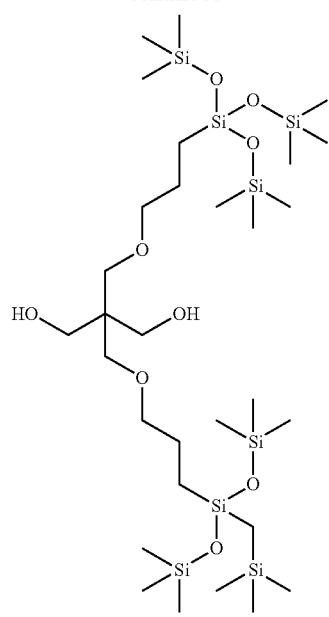
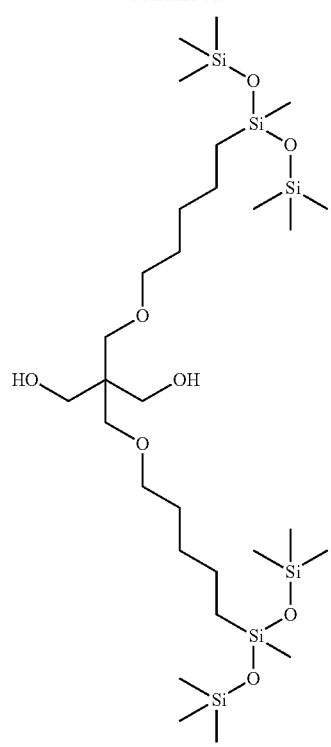
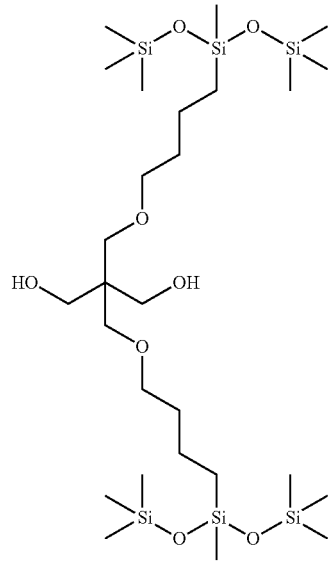
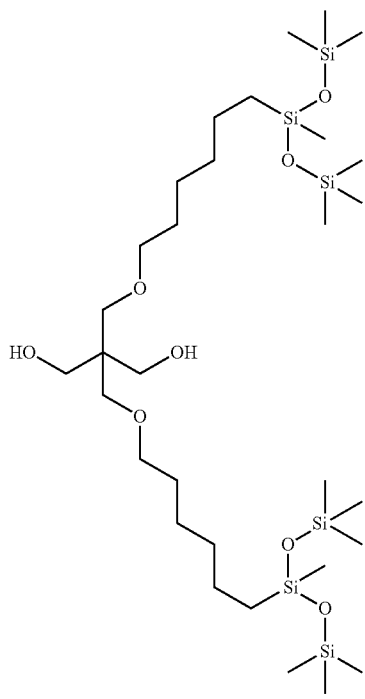

35
-continued
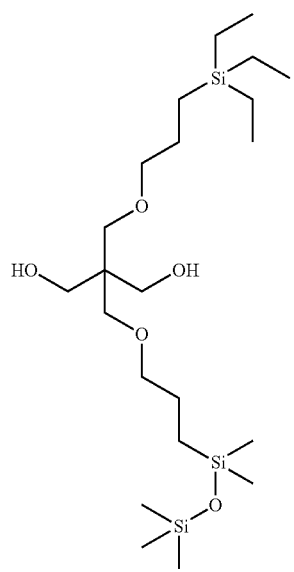
36
-continued
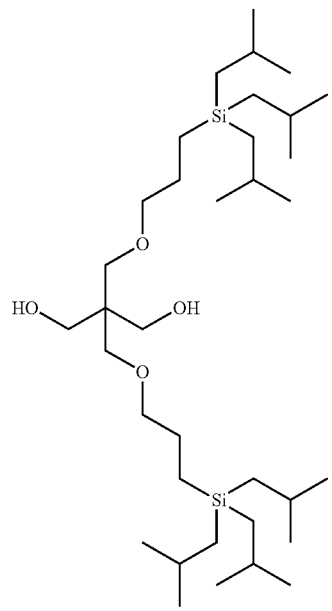
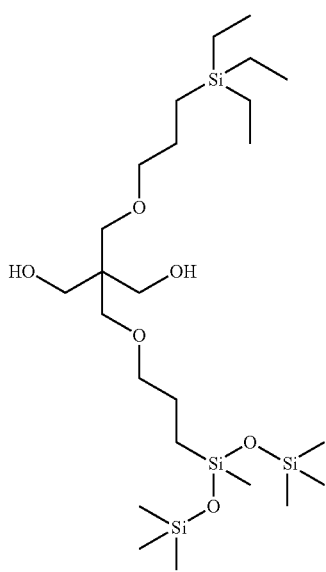
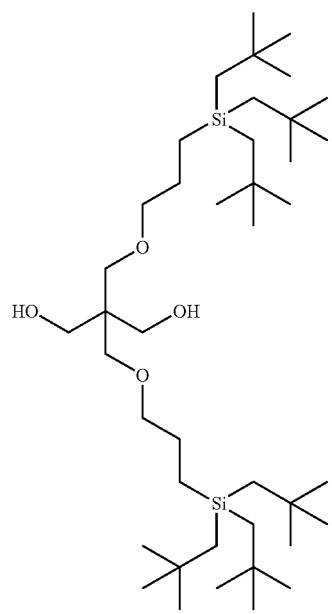

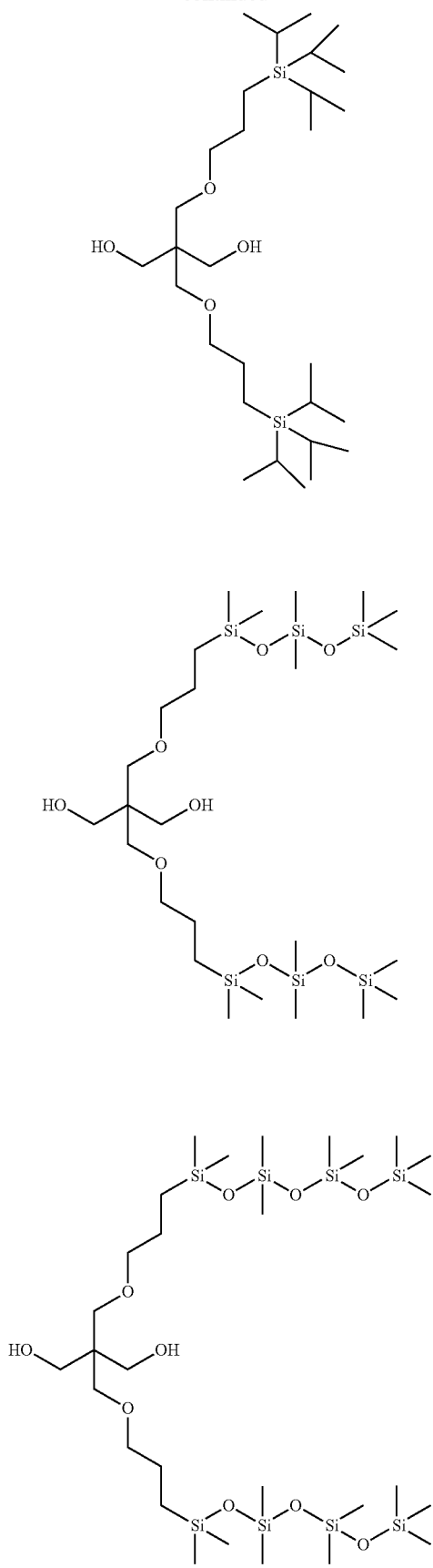
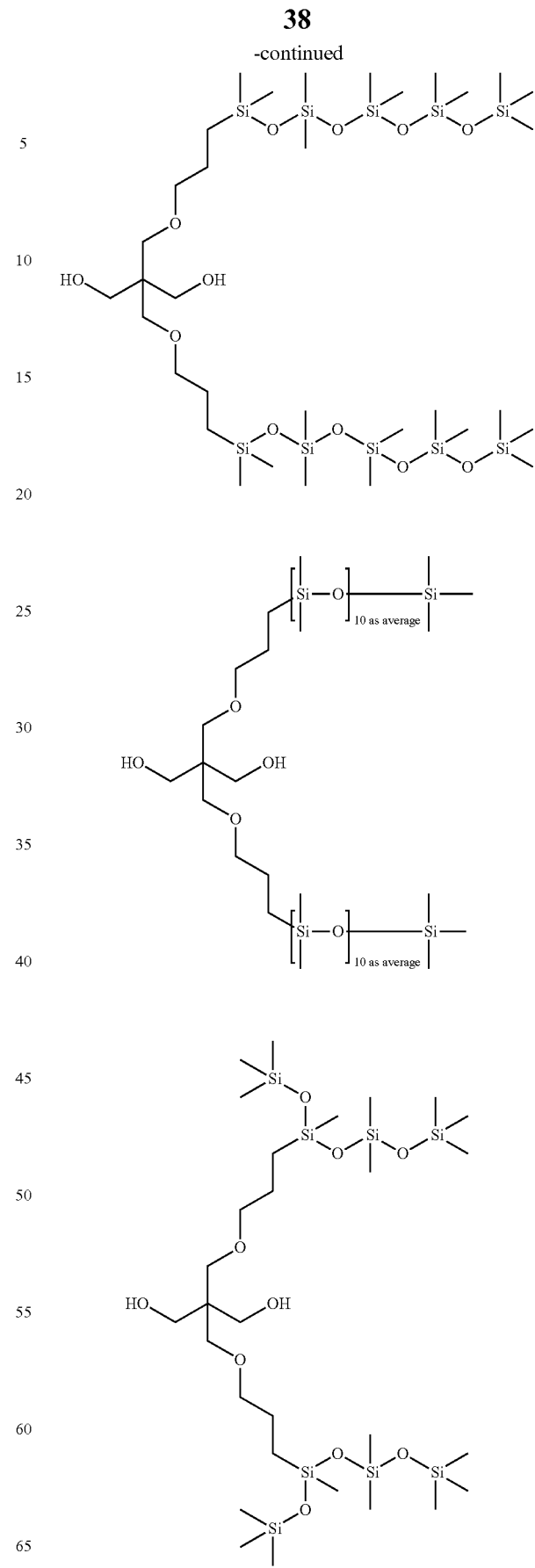

39
-continued
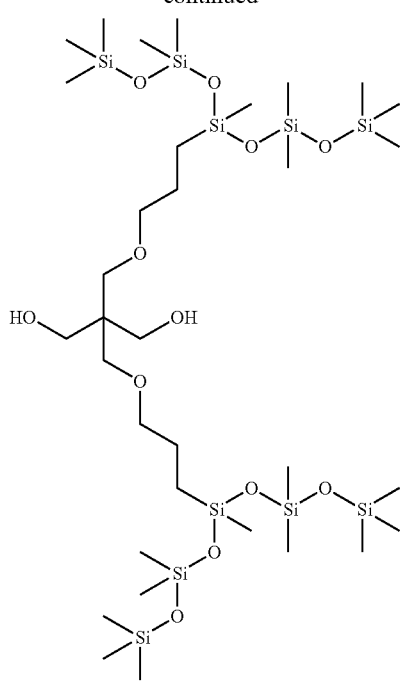
40
-continued
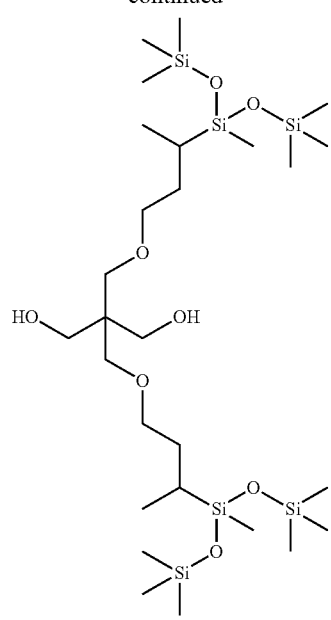
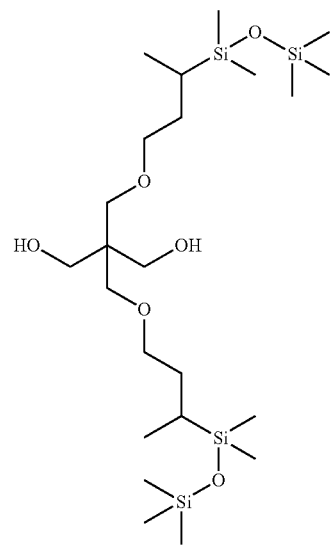
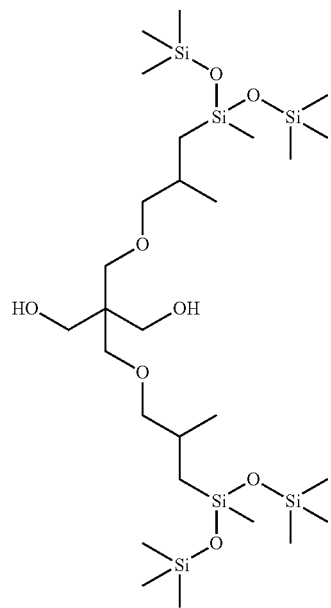

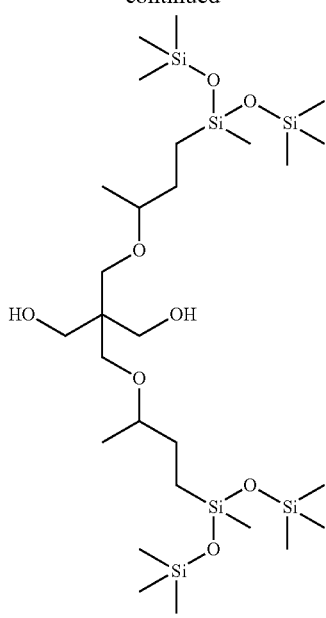

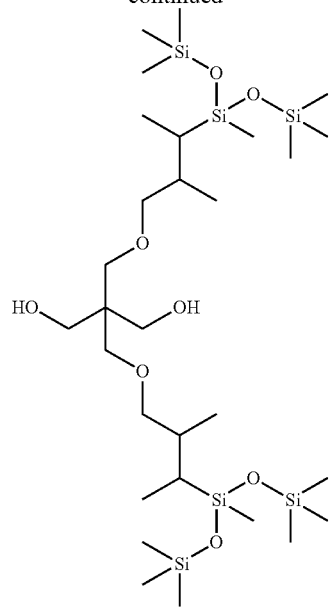

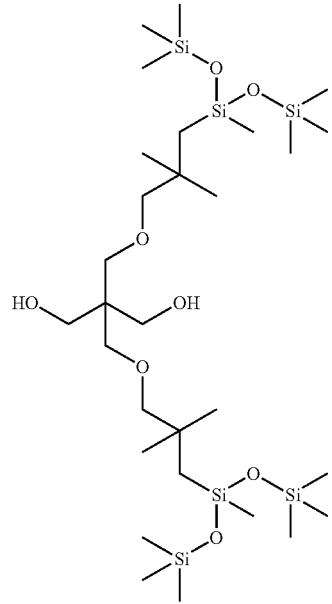

In each formula, the repeating unit represents the average value.

The polyurethane 1 having a structure represented by "a1" to "a4", "b1", and "b2" in the general formula (1), which gives a surface film of the stretchable film of the present invention, can be formed by employing a polycarbonate compound and a polyester compound having a hydroxyl group as a terminal group, and a diol compound having a silicon-containing group represented by the above-mentioned general formulae (b)-1' and (b)-2' as a raw material, and allowing the same to react with an isocyanate compound.

Illustrative example of the isocyanate compound that reacts with the above polycarbonate compound, the polyester compound and the diol compound having the above silicon-containing group includes the following compounds.

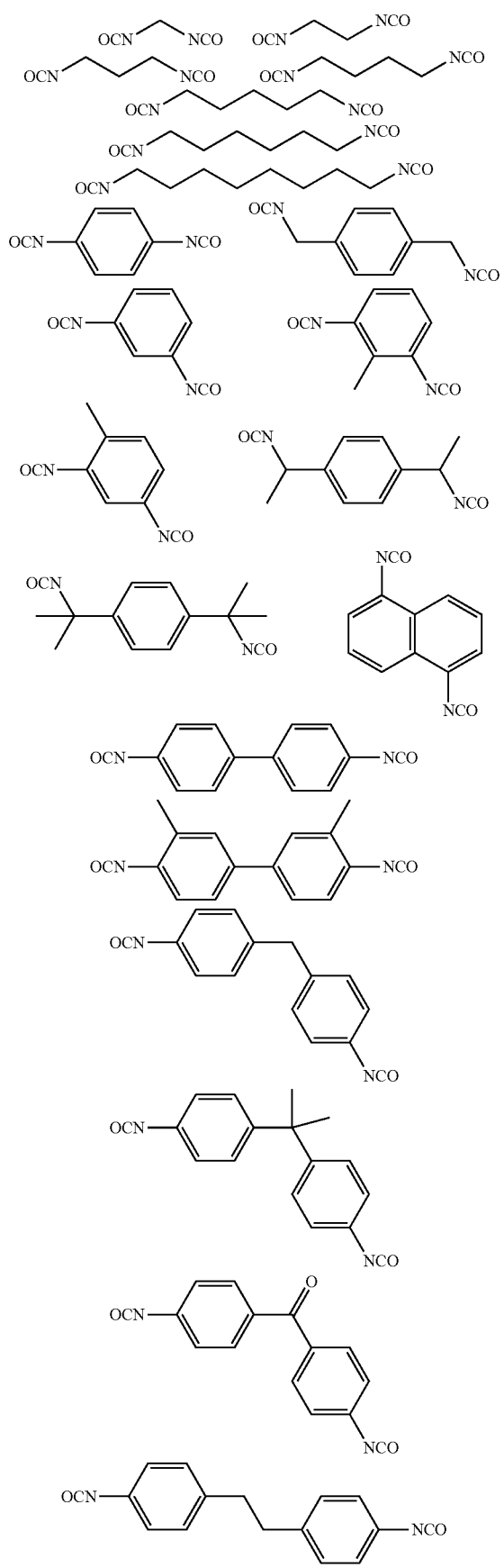
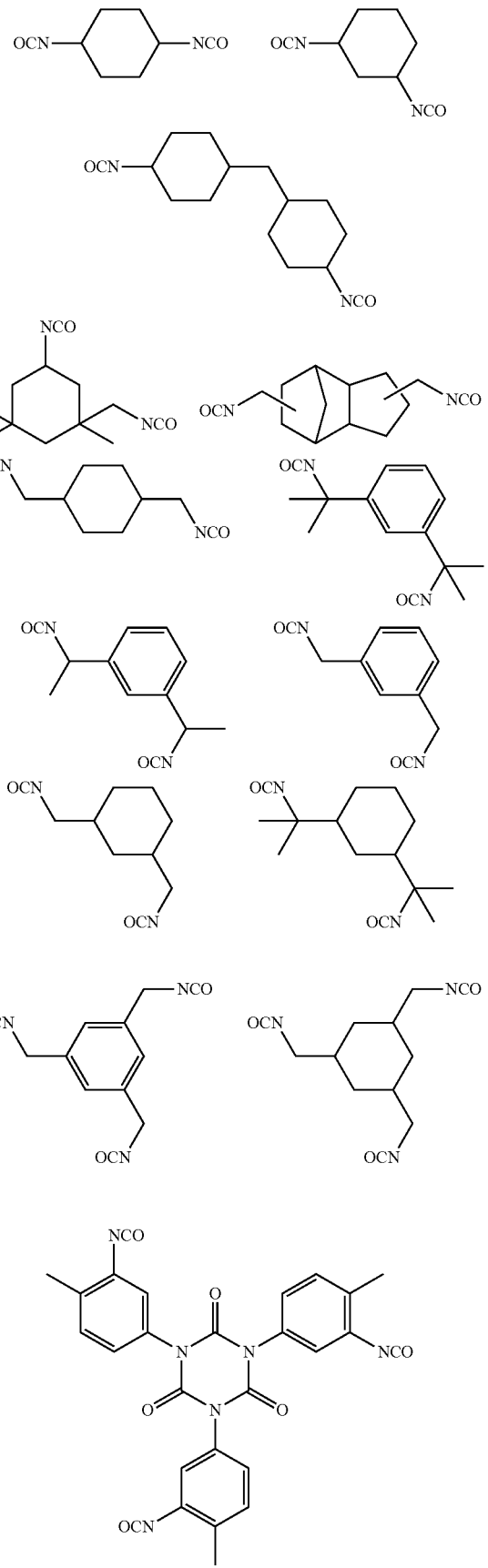
-continued

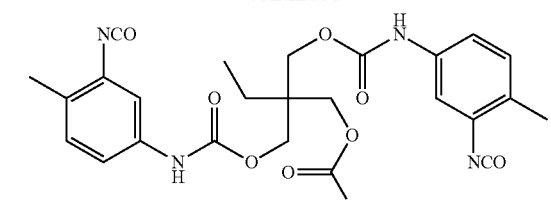
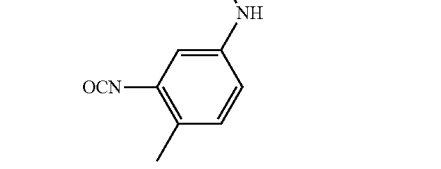
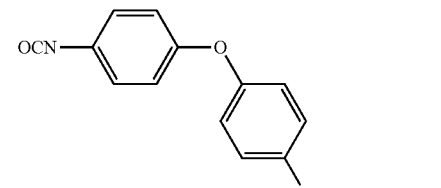
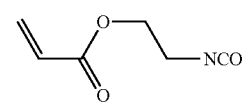
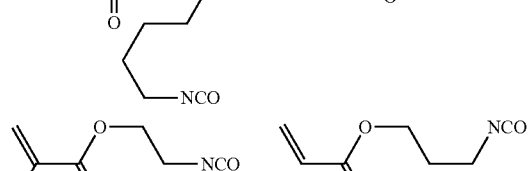
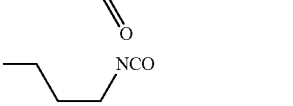
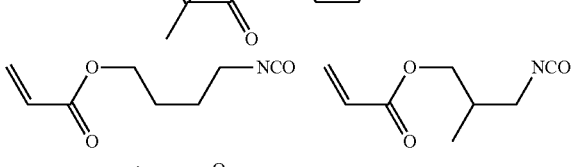
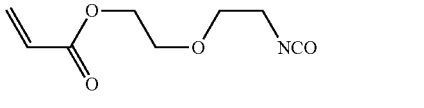
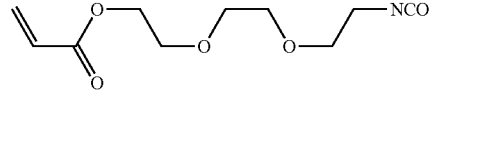
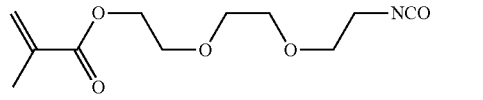
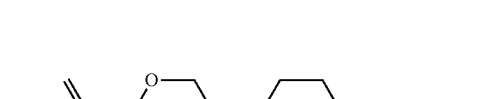
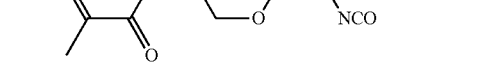
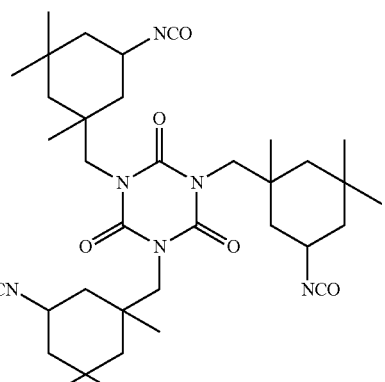
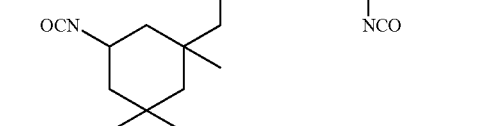
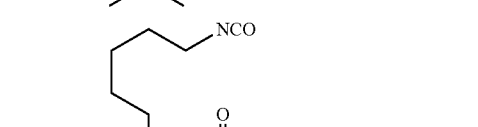
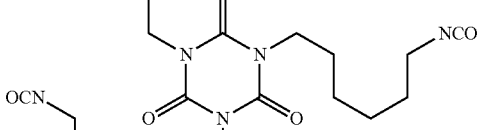
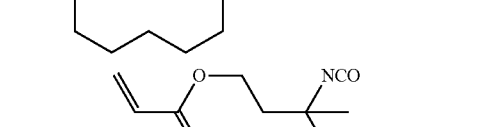
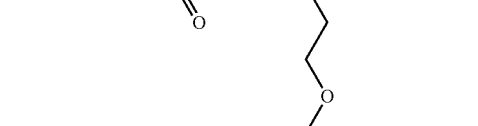
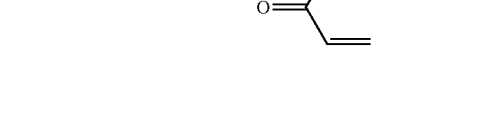
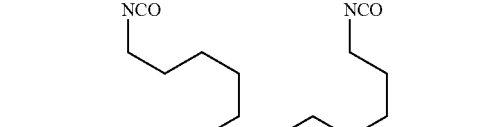
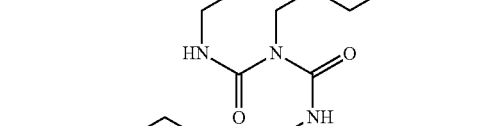
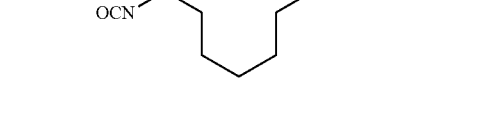
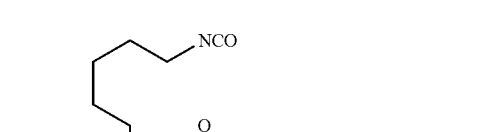
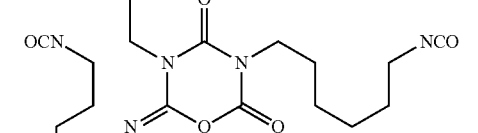

47

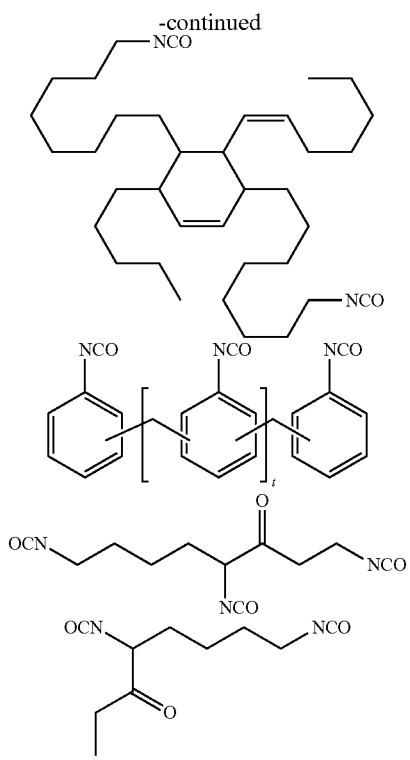

In the formula, t represents an integer of 1 or more.

An isocyanate compound containing a (meth) acrylate group in particular among the above-mentioned isocyanate compounds can react with a diol compound having a silicon-containing group represented by the general formulae (b)-1' and (b)-2', a polycarbonate compound or the like to obtain a compound containing a (meth) acrylate group as a terminal group represented by the general formula (3). A compound containing a (meth) acrylate group having a hydroxyl group can also react with an isocyanate compound to obtain a compound containing a (meth) acrylate group as a terminal group represented by the general formula (3).

With high reactivity of the above-mentioned isocyanate compound with the diol compound having a silicon-containing group represented by the general formulae (b)-1' and (b)-2', the polycarbonate compound or the like, it may be difficult to properly control such reactivity. An isocyanate compound can react with moisture in the air when kept in storage to deactivate an isocyanate group, which requires sufficient moisture control and other cautions for storage. Accordingly, in order to prevent the problem, a compound containing a blocked isocyanate group by protecting an isocyanate group with a substituent may be used.

A blocked isocyanate group can be a form of isocyanate group obtained by deprotection of a blocking group by heating. Illustrative example thereof includes isocyanate groups substituted by alcohol, phenol, thioalcohol, imine, ketimine, amine, lactam, pyrazole, oxime, and β-diketone.

A catalyst may be added to lower the deprotection temperature of a blocked isocyanate group. Illustrative example of the catalyst includes organic tin such as dibutyltin dilaurate, bismuth salt, and zinc carboxylate such as zinc 2-ethylhexanoate and zinc acetate.

In particular, Patent Document of JP-A-2012-152725A describes a technique capable of colder deprotection reaction by containing a α,β-unsaturated zinc carboxylate derived from carboxylic acid as a blocked isocyanate dissociation catalyst.

48

A compound containing an amino group may be added. The reaction of an isocyanate group and an amino group forms a urea bond. The portion formed of a urethane bond and a urea bond is called as "hard segment", which improves the strength by the resulting hydrogen bond. Accordingly, the strength can be improved by addition of not only a urethane bond, but also a urea bond. Thus, a compound containing an amino group is a strength-imparting agent.

[Inner Film]

The inner film of the present invention is a cured product of a polyurethane 2 containing a unit "c" having polyether and urethane bonds represented by the general formula (2).

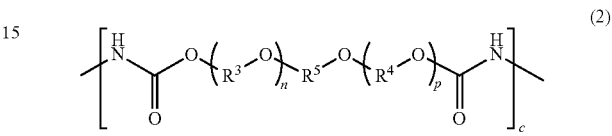

wherein, $R^3$ to $R^4$ represent the same or a different linear or branched alkylene group having 2 to 12 carbon atoms; $R^5$ represents a linear or branched alkylene group having 2 to 20 carbon atoms, or a divalent linking group containing an aromatic group, and optionally containing an ether group, a thiol group, an ester group, a sulfinyl group, a sulfonyl group, a carbonyl group, or a halogen atom. n and p represent an integer of 1 to 200. c represents the ratio of the repeating unit.

[Polyurethane 2]

A polyurethane 2 is polyurethane containing a unit "c" having polyether and urethane bonds represented by the general formula (2). The polyurethane 2 may be polyurethane containing the above-mentioned unit, and can include other structures.

In the formula (2), $R^3$ and $R^4$ represent the same or a different linear or branched alkylene group having 2 to 12 carbon atoms, and may be the same group as in the above-mentioned $R^1$ and $R^2$. $R^5$ represents a linear or a branched alkylene group having 2 to 20 carbon atoms, or a divalent linking group containing an aromatic group, and optionally containing an ether group, a thiol group, an ester group, a sulfinyl group, a sulfonyl group, a carbonyl group, or a halogen atom.

In order to obtain polyether in the repeating unit "c", the following polyether compounds having diol as a terminal group can be employed as a raw material.

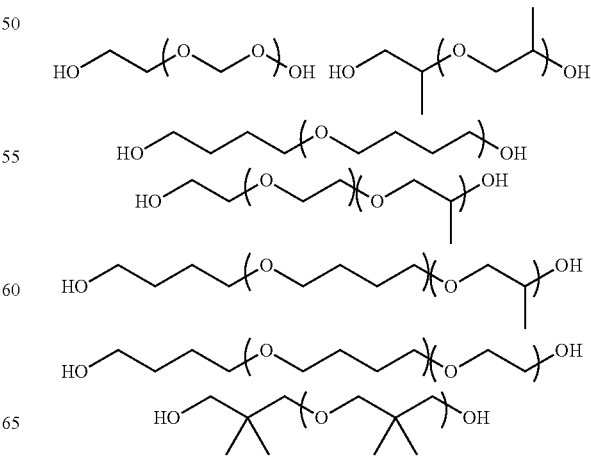

-continued
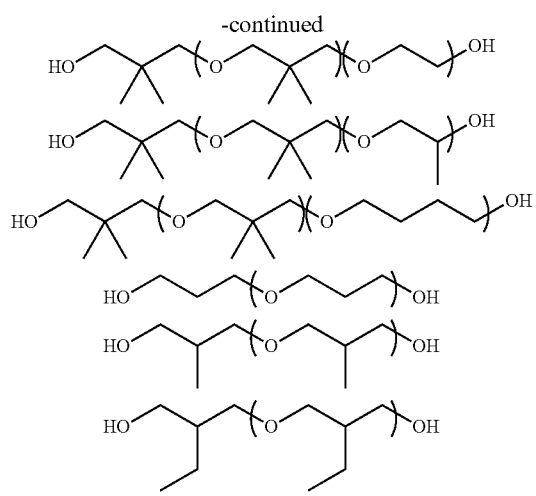
Herein, the repeating unit in parentheses represents n or p.
Illustrative example of the $R^5$ in the repeating unit "c" includes the following groups.
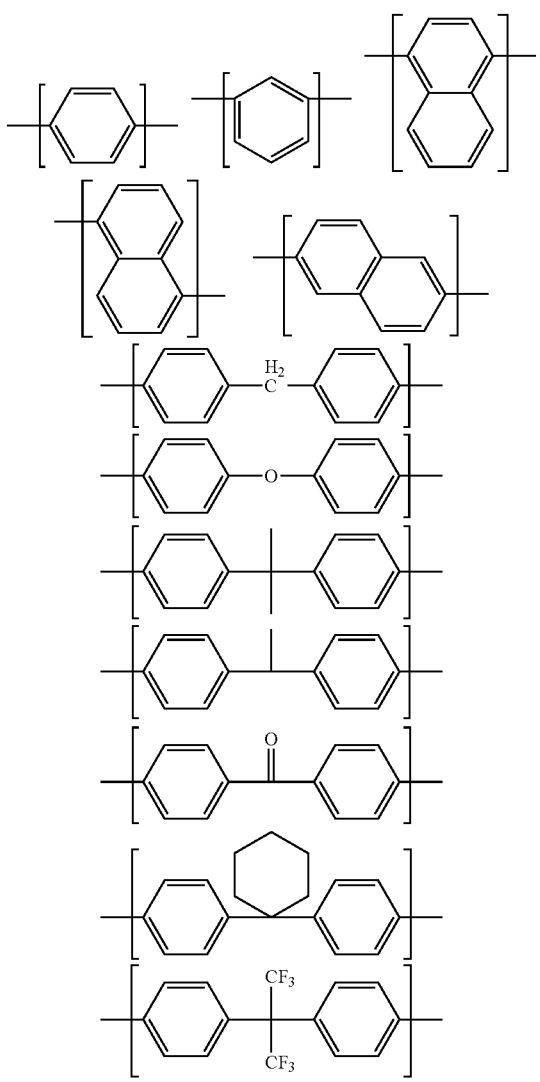
-continued
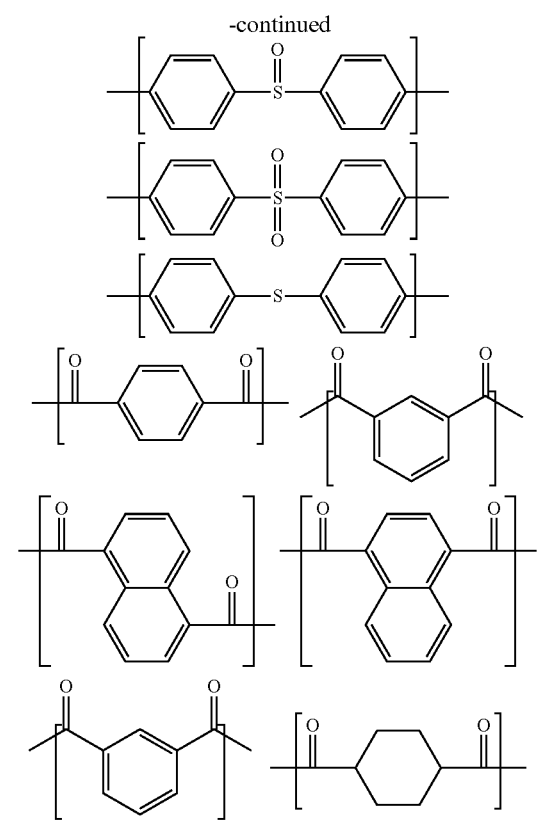
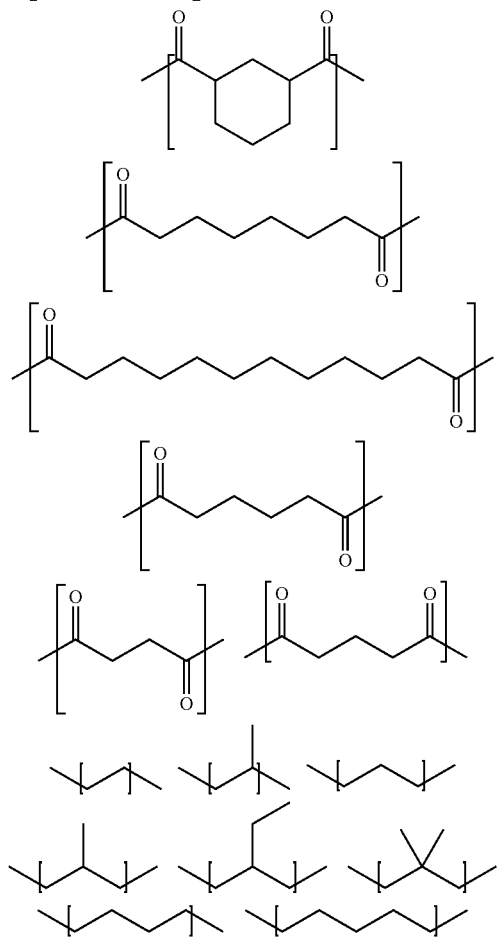

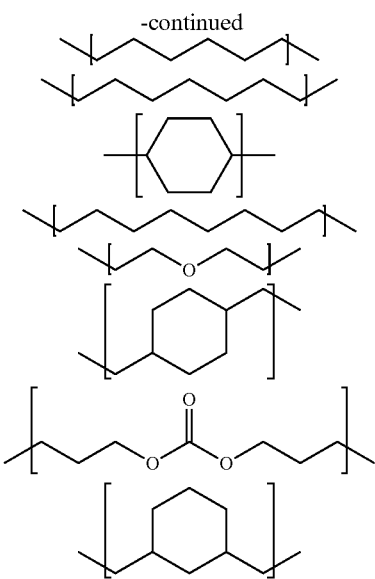

The polyurethane 2 having a structure represented by "c" in the general formula (2) can be obtained by allowing a polyether compound having a hydroxyl group as a terminal group to react with an isocyanate compound.

Illustrative example of the isocyanate compound that reacts with a polyol compound having a hydroxyl group as a terminal group includes an isocyanate compound that reacts with a polycarbonate compound having a hydroxyl group as a terminal group or a diol compound having a silicon-containing group employed as a raw material of the polyurethane 1.

An isocyanate compound containing a (meth) acrylate group among the above-mentioned isocyanate compounds can react with a polyol compound having a hydroxyl group as a terminal group to obtain a compound containing a (meth) acrylate group as a terminal group.

With high reactivity of the above-mentioned isocyanate compound with the polyol compound having a hydroxyl group as a terminal group, it may be difficult to properly control such reactivity. An isocyanate compound can react with moisture in the air when kept in storage to deactivate an isocyanate group, which requires sufficient moisture control and other cautions for storage. Accordingly, in order to prevent the problem, a compound containing a blocked isocyanate group by protecting an isocyanate group with a substituent may be used.

[Other Configurations]

The above-mentioned polyether-containing polyurethanes may each be obtained by copolymerizing a polyester "d". Illustrative example of the diol compound for obtaining a copolymerizable polyester portion includes the following compounds.

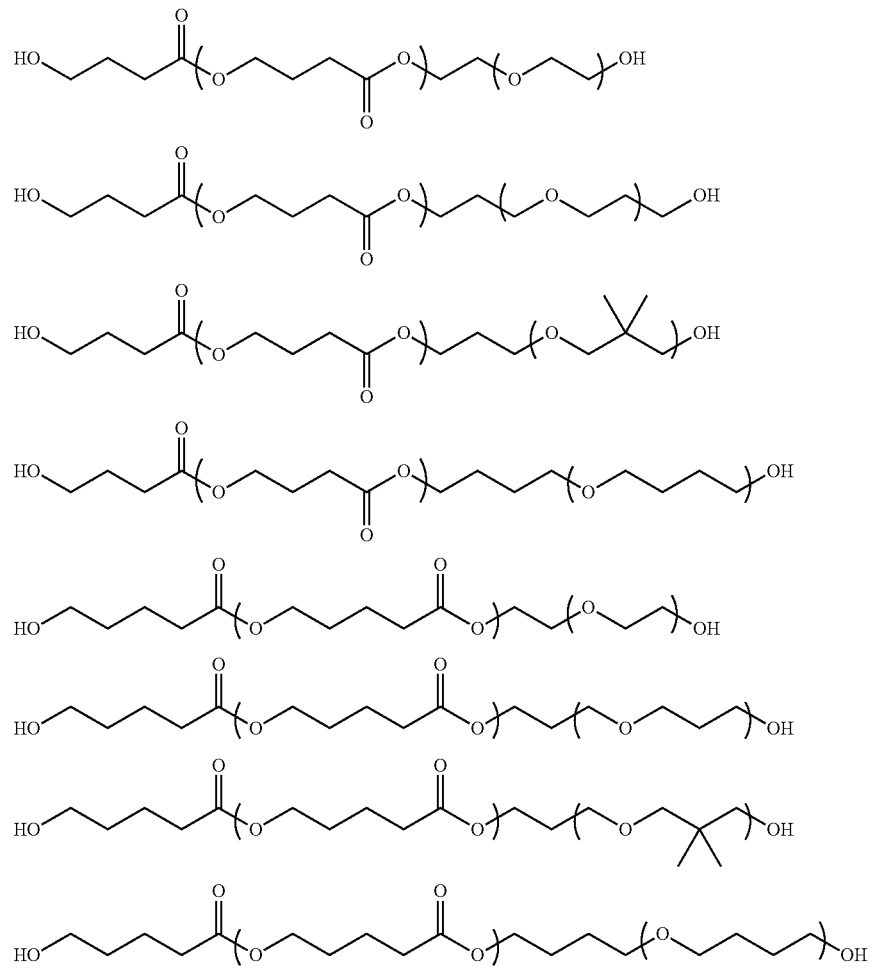

-continued

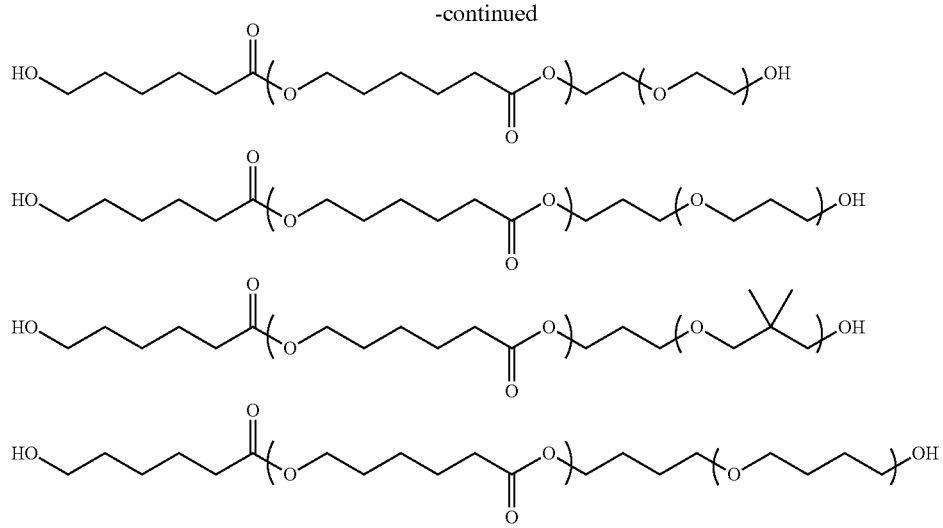

The polyurethanes 1 and 2 used in the method for forming a composite stretchable film of the present invention can include components other than those providing the above-mentioned "a1" to "a4", "b1", "b2", "c" or "d" units in the process of synthesis (production) as required. Illustrative example of these components includes a chain extender, a crosslinking agent, a catalyst, a strength-imparting agent, a radical generator, other monomers, a solvent, and a filler.

[Characteristics of Polyurethanes 1 and 2 and the Like]

The polyurethanes 1 and 2 used in the method for forming a composite stretchable film of the present invention preferably has a weight average molecular weight of 500 or more. The polyurethanes 1 and 2 can desirably be used in the stretchable film of the present invention. The upper limit of the weight average molecular weight of the resin is preferably 500,000 or fewer.

[Characteristics of Composite Stretchable Film and the Like]

In the composite stretchable film of the present invention, it is preferable that the thickness of an inner film be preferably 1 to 1000 μm, and the thickness of a surface film be 0.1 to 100 μm.

The surface film is preferably thinner than the inner film, and the ratio of "surface film"/"inner film" in thickness is preferably in the range of 0.3 to 0.0001.

In addition, the composite stretchable film of the present invention preferably has a stretching property of 20 to 1000% in a tensile test regulated by JIS K 6251. With the stretching property (elongation), the composite stretchable film can particularly desirably be used as a film coated on an elastic wire.

The composite stretchable film of the present invention is preferably used as a film in contact with a conductive wiring having stretchability. The stretchable film of the present invention can desirably be used particularly for these applications.

The composite stretchable film of the present invention described above can be a stretchable film excellent in elasticity, strength, and hysteresis that are equivalent to a polyurethane component, and the film surface has excellent water repellency and non-sticky feeling that are equivalent to a silicone component.

<Method for Forming a Composite Stretchable Film>

In addition, the present invention provides a method for forming a composite stretchable film comprising:

applying a polyurethane 1 containing a copolymer of one or more of units "a1", "a2", "a3", and "a4", each having polycarbonate or polyester and urethane bonds, and silicone-pendant type urethane units "b1" and/or "b2" represented by the following general formula (1) on an inner film which is a cured product of a polyurethane 2 containing a unit "c" having polyether and urethane bonds represented by the following general formula (2); and curing the polyurethane 1 by heating and/or light exposure to form a surface film:

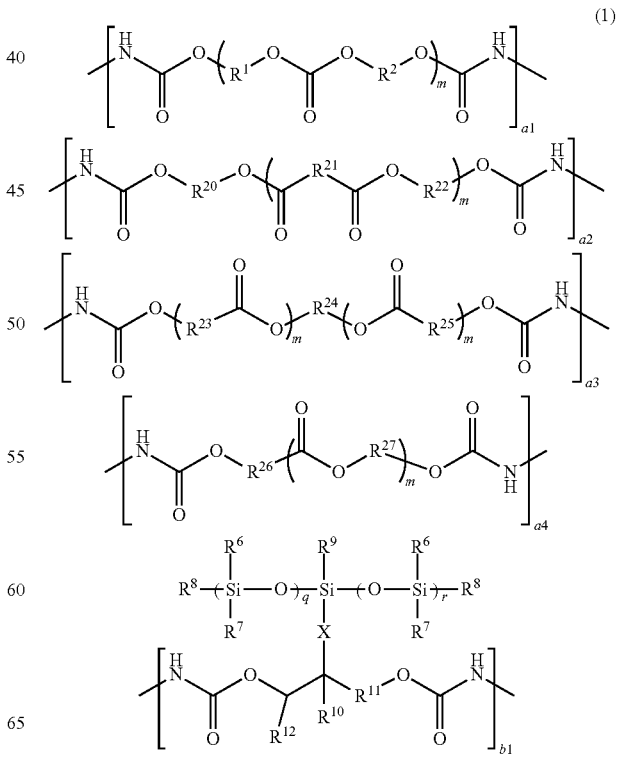

-continued

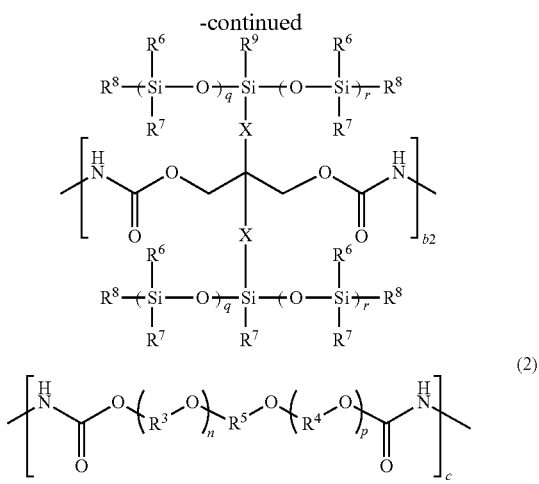

(2)

$R^1$ to $R^{12}$, $R^{20}$ to $R^{27}$, X, m, n, p, q, r, s, a1, a2, a3, a4, b1, b2, and c represent the same meanings as before.

The above-mentioned inner film may be a cured product of a polyurethane 2 itself, or may be formed by applying a polyurethane 2 on a substrate and curing the same by heating and/or light exposure.

In the method for forming a composite stretchable film, a polyether diol compound for forming a "c" unit in the general formula (2), a compound containing an isocyanate group, a polyester diol compound for chain extension, a polycarbonate diol compound, an amine compound, a compound containing 3 or more hydroxyl groups as a crosslinking agent and a catalyst are mixed, and a film is formed from the resulting mixture and cured by heating or light exposure to form an inner film (first layer of film) as a base. On this first-layer stretchable film as a base is preferably formed (laminated) a surface film (second layer of film) obtained by mixing a polycarbonate compound for forming an "a" unit in the above general formula (1), a polyester compound, a silicone-pendant type diol compound for forming "b1" unit and/or "b2" unit, a compound containing an isocyanate group, and optionally a polyether diol compound for chain extension, a polyester diol compound, an amine compound, a compound containing 3 or more hydroxyl groups as a crosslinking agent and a catalyst, subsequently forming a film from the resulting mixture and curing the same by heating or light exposure.

One example of the method for forming a stretchable film is achieved by applying, heating and curing a first layer of the above-mentioned mixture on a substrate and a second layer thereof on the first layer.

In the method, the reaction of an isocyanate group and a hydroxyl group forms a urethane bond and gets higher molecular weight to form a polymer network. The addition of a compound containing 3 or more hydroxyl groups or isocyanate groups promotes crosslinking reaction to reduce the elasticity, but to improve the film strength. Accordingly, the amount of a compound containing two or 3 hydroxyl groups or isocyanate groups to be added is controlled to adjust the hardness, elasticity, and strength. Peeling of a film from the substrate after curing can obtain a single stretchable film.

Preferably, the molar number of hydroxyl group is the same as or larger than the isocyanate group in the mixture, or the value by dividing the molar number of hydroxyl group by the molar number of isocyanate group is one or more. If the molar number of isocyanate group is smaller, reaction of an excess of isocyanate group and water generates no carbon dioxide, thereby no possibility of generating a hole in a film due to foam. Preferably, preparation of urethane foam involves an excess of isocyanate group. However, the stretchable film of the present invention requires high strength, thereby preferably generating no hole of foam in a film.

When a resin included in the stretchable film of the present invention is formed with larger molar number of hydroxyl group than isocyanate group as described above, a urethane bond can be formed only on either side of a diol compound represented by the general formulae (b')-1 and (b')-2 at a terminal of polymer.

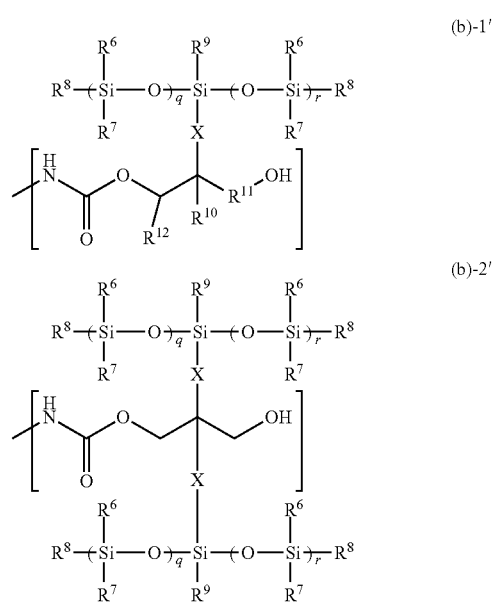

wherein, $R^6$ to $R^9$, X, q, and r represent the same meanings as before.

Another method for film formation is prepolymer process. In this process, a compound containing hydroxyl groups and an isocyanate compound are mixed to form a polymer (prepolymer), and a compound containing a hydroxyl group or a compound containing an isocyanate group can additionally be mixed to be heated and cured to form a film. When a prepolymer is formed, either of a compound containing a hydroxyl group and an isocyanate compound is prepared in excess to increase the molecular weight. The prepolymer process can reduce the amount of residual unreactive isocyanate compared to one-shot process in which a compound containing a hydroxyl group and an isocyanate compound is mixed to form a film at a time, and a non-crosslinking portion can be reduced to form a high-strength film.

In the curing process, the heating temperature is preferably in the range of room temperature to 200° C., more preferably in the range of 40 to 160° C. for 5 seconds to 60 minutes. In the heating curing process, either or both sides of a film may be covered with a release film. Preferably, either side is covered in curing while winding the film on a roll or both sides are covered in batch curing, but the curing process is not restricted thereto.

Additionally, a urethane polymer is synthesized by allowing an isocyanate group to react with a hydroxyl group, on which a (meth) acrylate group is formed as a terminal group represented by the general formula (3), and the polymer can be shaped into a film and cured by heating and/or light exposure to form a composite stretchable film. Specifically, in the case of polycarbonate- or polyester-containing silicone-pendant type polyurethane acrylate, a protected or unprotected isocyanate compound, and a (meth) acrylate compound containing an isocyanate group or (meth) acrylate containing a hydroxyl group are mixed with a polycarbonate diol compound for obtaining a unit "a1" in the above general formula (1), a polyester diol compound for obtaining units "a2" to "a4", a silicone-pendant type diol compound for obtaining units "b1" and "b2" for polymerization to synthesize a polycarbonate-containing silicone-pendant type urethane (meth) acrylate polymer containing (meth) acrylate as a terminal group of a polymer.

The polyether-containing polyurethane inner film may be a thermoplastic polyurethane (TPU) film. A TPU film may be a commercially available product.

When a urethane (meth) acrylate polymer is shaped into a film and cured by heating or light exposure to form a stretchable film, (meth) acrylate is allowed to react with a free radical to be crosslinked. The method for radical crosslinking is preferably to add a radical generator. Illustrative example of the radical generator includes a heat radical generator for generating a free radical by thermal decomposition and a photo radical generator for generating a free radical by light exposure.

Illustrative example of the heat radical generator includes an azo radical generator and a peroxide radical generator. Illustrative example of the azo radical generator includes 2,2'-azobisisobutyronitrile (AIBN), 2,2'-azobis (2-4-dimethylvaleronitrile), dimethyl 2,2'-azobis(2-methylpropionate), 2,2'-azobis (4-methoxy-2,4-dimethylvaleronitrile), 2,2'-azobis (cyclohexane-1-carbonitrile), and 4,4'-azobis (4-cyanovaleric acid). Illustrative example of the peroxide radical generator includes benzoyl peroxide, decanoyl peroxide, lauroyl peroxide, succinyl peroxide, t-butylperoxy-2-ethylhexanoate, t-butylperoxypivaloate, and 1,1,3,3-tetramethylbutylperoxy-2-ethylhexanoate.

Illustrative example of the photo radical generator includes acetophenone, 4,4'-dimethoxybenzyl, benzyl, benzoin, benzophenone, 2-benzoylbenzoic acid, 4,4'-bis (dimethylamino)benzophenone, 4,4'-bis (diethylamino)benzophenone, benzoinmethyl ether, benzoinethyl ether, benzoinisopropyl ether, benzoinbutyl ether, benzoinisobutyl ether, 4-benzoylbenzoic acid, 2,2'-bis (2-chlorophenyl)-4,4', 5,5'-tetraphenyl-1,2'-biimidazole, methyl 2-benzoylbenzoate, 2-(1,3-benzodioxole-5-yl)-4,6-bis(trichloromethyl)-1,3, 5-triazine, 2-benzyl-2-(dimethylamino)-4'-morpholinobutyrophenone, 4,4'-dichlorobenzophenone, 2,2-diethoxyacetophenone, 2,2-dimethoxy-2-phenylacetophenone, 2,4-diethylthioxanthen-9-one, diphenyl (2,4,6-trimethylbenzoyl) phosphine oxide, 1,4-dibenzoylbenzene, 2-ethylanthraquinone, 1-hydroxycyclohexylphenyl ketone, 2-hydroxy-2-methylpropiophenone, 2-hydroxy-4'-(2-hydroxyethoxy)-2-methylpropiophenone, 2-isonitrosopropiophenone, 2-phenyl-2-(p-toluenesulfonyloxy) acetophenone (BAPO), and camphor quinone.

The amount of the heat or photo radical generator to be added is preferably in the range of 0.1 to 50 parts by mass, relative to 100 parts by mass of resin.

In addition, a crosslinking agent containing a plurality of (meth) acrylates or thiols may be added to improve the efficiency of radical crosslinking.

A monomer containing an alkyl group or an aryl group, or a monomer containing an alkyl group or an aryl group substituted by a silicon-containing group or fluorine may be added. Accordingly, the viscosity of a solution can be reduced, and thinner stretchable films can be formed. If these monomers include a polymerizable double bond, they are immobilized in a film as the film is cured.

Illustrative example of the monomer containing an alkyl group or an aryl group includes isobornyl acrylate, lauryl acrylate, tetradecyl acrylate, stearyl acrylate, isostearyl acrylate, behenyl acrylate, adamantane acrylate, phenoxy ethylene glycol acrylate, phenoxy diethylene glycol acrylate, and 2 to 6 functional acrylates. Illustrative example of the bifunctional acrylate includes 1,6-hexane diol diacrylate, 1,9-nonane diol diacrylate, isononane diol diacrylate, 1,10-decane diol diacrylate, neopentyl glycol diacrylate, 2-hydroxy-3-methacryl propyl acrylate, diethylene glycol diacrylate, triethylene glycol diacrylate, polyethylene glycol diacrylate, dipropylene glycol diacrylate, tripropylene glycol diacrylate, polypropylene glycol diacrylate, polytetramethylene glycol diacrylate, polyethylene polypropylene glycol diacrylate, dioxane glycol diacrylate, tricyclodecanedimethanol diacrylate, 9,9-bis[4-(2-hydroxyethoxy)phenyl]fluorene diacrylate, ethoxylated bisphenol A diacrylate, propoxylated bisphenol A diacrylate, and ethoxylated propoxylated bisphenol A diacrylate. Illustrative example of the tri-functional acrylate includes trimethylolpropane triacrylate, ethoxylated trimethylolpropane triacrylate, propoxylated trimethylolpropane triacrylate, glycerin triacrylate, ethoxylated glycerin triacrylate, propoxylated glycerin triacrylate, tris (2-acryloxyethyl)isocyanurate, caprolactone modified tris (2-acryloxyethyl)isocyanurate, and pentaerythritol triacrylate. Illustrative example of the tetra-functional acrylate includes pentaerythritol tetraacrylate, ethoxylated pentaerythritol tetraacrylate, propoxylated pentaerythritol tetraacrylate, ditrimethylolpropane tetraacrylate, ethoxylated ditrimethylolpropane tetraacrylate, and propoxylated ditrimethylolpropane tetraacrylate. Illustrative example of the penta- and hexa-functional acrylates includes dipentaerythritol polyacrylate, ethoxylated dipentaerythritol polyacrylate, and propoxylated dipentaerythritol polyacrylate. A monomer may be used by replacing the acrylate with methacrylate.

When a stretchable film is formed using a compound containing a (meth) acrylate group as a terminal group, the film may be cured by combining thermal curing and light exposure curing processes. For example, a base stretchable film may be formed by thermal curing, and a stretchable film thereon may be formed by light exposure curing. Advantageously, the light exposure curing technique doesn't always require heating and allows for short-time curing. Unfortunately, the light exposure curing fails to cure portions that cannot receive light. A combination of thermal curing and light exposure curing can provide curing options, by taking advantage of each of the characteristics.

For example, a solution obtained by mixing a base polymer represented by a unit "c" in the general formula (2) and a radical generator is applied on a substrate, and cured by heating or light exposure to form a first layer, on which a solution obtained by mixing a base polymer represented by combinations of units "a1" to "a4", and "b1" and "b2" in the general formula (1) and a radical generator is applied as a second layer, and cured by heating or light exposure to form a stretchable film.

A first layer may be formed by mixing a protected or unprotected isocyanate compound, a compound containing a plurality of hydroxyl groups for chain extension or crosslinking, optionally a compound containing an amino group with a polyol diol compound for obtaining a "c" unit represented by the general formula (2) and curing the mixture, and a second layer may be formed by applying a mixed solution of a silicone-pendant type polyurethane (meth) acrylate represented by combinations of units "a1" to "a4", and "b1" and "b2" in the formula (1) and a radical generator and curing the mixture by heating or light. Alternatively, a first layer may be formed by applying a mixed solution of polyurethane (meth) acrylate represented by a "c" unit in the formula (2) and curing the mixture by heating or light, and a second layer may be formed by mixing a protected or unprotected isocyanate compound, a compound containing a plurality of hydroxyl groups for chain extension or crosslinking, optionally a compound containing an amino group with a polycarbonate diol compound and a polyester diol compound for obtaining "a1" to "a4" units represented by the general formula (1) and curing the mixture.

A typical method for forming a first layer of the stretchable film of the present invention is to apply the above-mentioned composition on a flat substrate or a roll. Illustrative example of the method for applying the composition includes spin coating, bar coating, roll coating, flow coating, dip coating, spray coating, and doctor coating.

A typical method for forming a second layer of the stretchable film of the present invention is the same as the method for forming a first layer of the stretchable film of the present invention. In the composite stretchable film of the present invention, the thickness of an inner film is 1 to 1000 μm, and the thickness of a surface film is 0.1 to 100 μm. The surface film is preferably thinner than the inner film, and the ratio of the "surface film"/"inner film" in thickness is preferably in the range of 0.3 to 0.0001.

Preferable encapsulating of parts with unevenness involves such methods as roll coating and spray coating, and a method for application only to a required portion by screen-printing and others. In addition, the viscosity of a mixed solution needs adjusting to conduct various coating and printing operations. Low viscosity can be achieved by mixing an organic solvent, while high viscosity can be made by mixing a filler such as silica.

Preferably, the organic solvent has a boiling point at atmospheric pressure in the range of 115 to 200° C. Specifically, the organic solvent is preferably one or more types selected from 2-octanone, 2-nonanone, 2-heptanone, 3-heptanone, 4-heptanone, 2-hexanone, 3-hexanone, disobutyl ketone, methyl cyclohexanone, acetophenone, methylacetophenone, propyl acetate, butyl acetate, isobutyl acetate, amyl acetate, butenyl acetate, isoamyl acetate, phenyl acetate, propyl formate, butyl formate, isobutyl formate, amyl formate, isoamyl formate, methyl valerate, methyl pentenoate, methyl crotonate, ethyl crotonate, propylene glycol monomethyl ether, ethylene glycol monomethyl ether, propylene glycol monoethyl ether, ethylene glycol monoethyl ether, propylene glycol dimethyl ether, diethylene glycol dimethyl ether, propylene glycol monomethyl ether acetate, and propylene glycol monoethyl etheracetate.

When a compound containing a (meth) acrylate group as a terminal group is cured by heating, thermal curing can be conducted e.g., on a hot plate or in an oven, or by far-infrared ray irradiation. Such a compound is preferably heated at 30 to 150° C. for 10 seconds to 60 minutes, and more preferably at 50 to 120° C. for 30 seconds to 20 minutes. Baking may be conducted in atmosphere, inert gas or vacuum.

When a compound containing a (meth) acrylate group as a terminal group is cured by light exposure, the light exposure curing is preferably performed with a wavelength of 200 to 500 nm. A light source can be selected from a halogen lamp, a xenon lamp, an excimer laser, a metal halide lamp, LED and the like. Electron beam irradiation is also allowed. Preferably, the amount for irradiation is in the range of 1 mJ/cm$^2$ to 100 J/cm$^2$.

The composite stretchable film of the present invention is a composite stretchable film obtained by forming a surface film (a polycarbonate- or polyester-containing silicone-pendant type polyurethane layer) on a surface of an inner film (a polyether-containing polyurethane layer), and either or both faces of a polyether-containing polyurethane layer may be covered with a polycarbonate or polyester-containing silicone-pendant type polyurethane layer. The thickness of a polycarbonate- or polyester-containing silicone-pendant type polyurethane film is not particularly restricted, but it is preferably smaller than a polyether-containing polyurethane layer due to less degrading hysteresis and high elasticity.

The organic solvent can be mixed to form a thinner polycarbonate- or polyester-containing silicone-pendant type polyurethane layer. A solution of a polyether-containing polyurethane layer in an inner film may or may not contain an organic solvent.

As described above, the method for forming a stretchable film of the present invention provides elasticity and strength that are equivalent to or more desirable than a polyurethane component. In addition, a stretchable film having high water repellency and low tackiness on the film surface can readily be formed.

<Use of Composite Stretchable Film>

The composite stretchable film of the present invention can not only be used as a single self-supporting film, but also be formed on a fiber or a membrane film.

Figure 2:
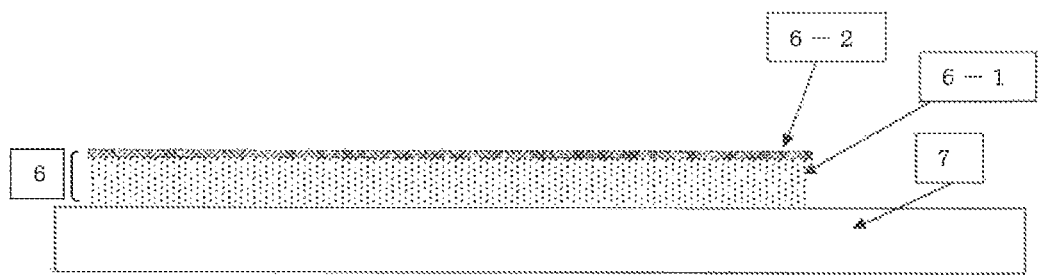
FIG. 2 is a cross-sectional view showing the composite stretchable film of the present invention formed on a substrate.
Figure 3:
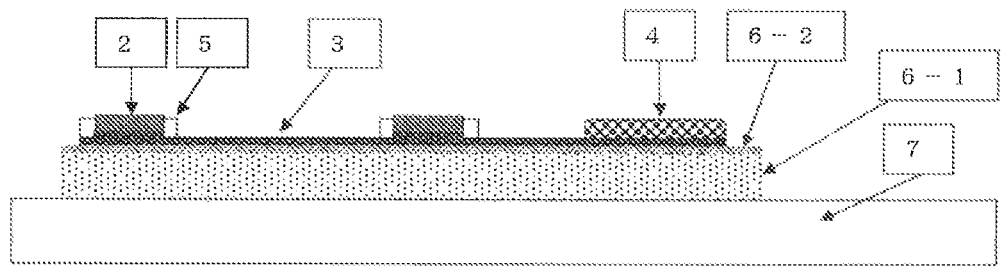
FIG. 3 is a cross-sectional view showing the electrocardiograph formed on the composite stretchable film of the present invention.
Figure 4:
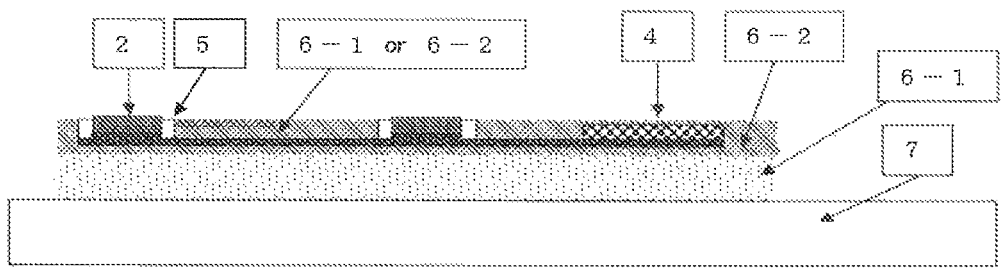
FIG. 4 is a cross-sectional view showing a wire and a center device in FIG. 3 covered with the stretchable film.

Herein, FIGS. 1 to 7 show the applications of a stretchable film of the present invention. FIG. 1 is a schematic illustration of an electrocardiograph 1 formed on a composite stretchable film 6 of the present invention viewed from the bio-electrode side. FIG. 2 is a cross-sectional view showing the composite stretchable film 6 (stretchable film first layer 6-1, stretchable film second layer 6-2) of the present invention formed on a substrate 7, FIG. 3 is a cross-sectional view showing the electrocardiograph 1 formed on the composite stretchable film 6, FIG. 4 is a cross-sectional view showing an elastic wire 3 and a center device 4 of the electrocardiograph 1 shown in FIG. 3 covered with the stretchable film 6, and the electrocardiograph 1 shown in FIG. 1 corresponds to the one in Patent Document 1. As shown in FIG. 1, in the electrocardiograph 1, 3 bio-electrodes 2 are linked to the center device 4 via the wire 3 for transmitting electric signals.

The wire 3 may be formed of a conductive material including metal such as gold, silver, platinum, titanium, and stainless as well as carbon. In order to provide sufficient elasticity, the wire 3 may be meandering-shaped as shown in Patent Document 1. Also, the wire 3 may be formed by applying a powder of the conductive material or a wire-shaped conductive material on a stretchable film, printing a conductive ink including the conductive material, or using a conductive cloth which is a conductive material and fibers combined.

Since the electrocardiograph 1 must be applied to the user's skin, and as shown in FIGS. 3 and 4, an adhesive portion 5 is disposed around each of the bio-electrodes 2 to prevent each electrode from coming off the skin. However, the use of an adhesive bio-electrode 2 doesn't always require a surrounding adhesive portion 5.

The electrocardiograph 1, as shown in FIG. 1, is prepared on the stretchable film 6 as the composite stretchable film of the present invention. The stretchable film 6 is less tacky on the surface, thereby providing favorable separation from a printing plate when the film is printed, e.g., screen-printed.

Specifically, film separation from the plate preferably brings about ink separation, thereby never failing to transfer ink on the stretchable film 6.

Further, the elastic wire 3 can be covered with the stretchable film 6. The stretchable film 6 may not always be composite, and may be composed of only either of a stretchable film first layer 6-1 and a stretchable film second layer 6-2. In FIG. 4, the elastic wire 3 is covered with the stretchable film second layer 6-2.

Figure 5:
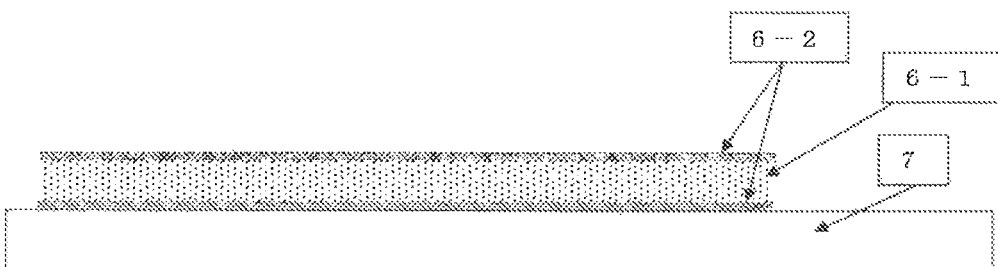
FIG. 5 is a cross-sectional view showing both faces of a first layer of the stretchable film covered with second layers of the stretchable film.
Figure 6:
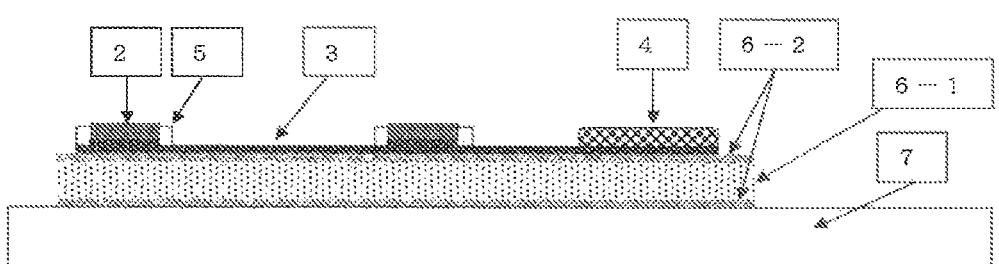
FIG. 6 is a cross-sectional view showing the electrocardiograph formed on the composite stretchable film in FIG. 5.
Figure 7:
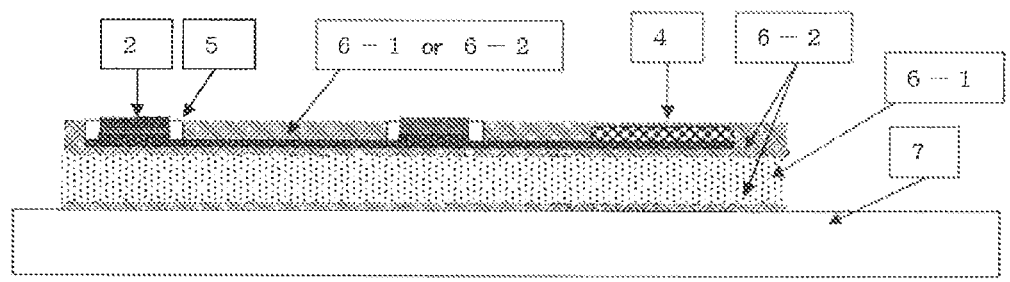
FIG. 7 is a cross-sectional view showing the wire and the center device in FIG. 6 covered with the stretchable film.
Figure 8:
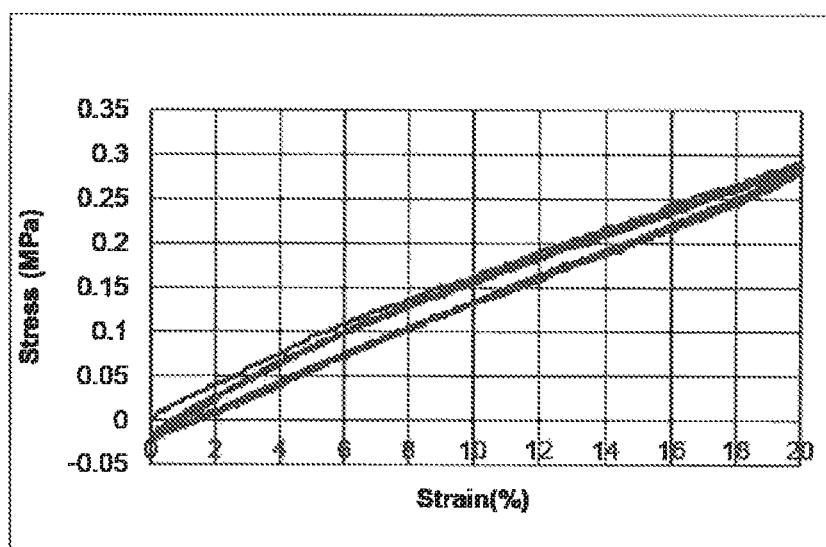
FIG. 8 is a hysteresis curve of elasticity and stress of a stretchable film in Example 1.
Figure 9:
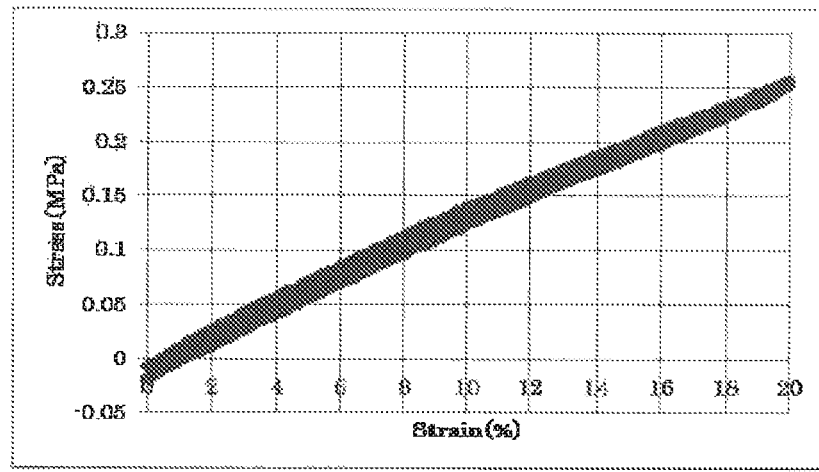
FIG. 9 is a hysteresis curve of elasticity and stress of a stretchable film in Comparative Example 1.
Figure 10:
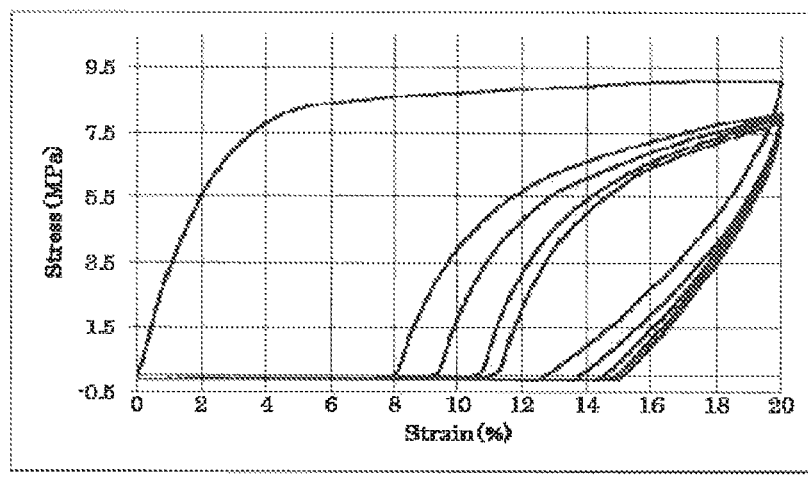
FIG. 10 is a hysteresis curve of elasticity and stress of a stretchable film in Comparative Example 2.
Figure 11:
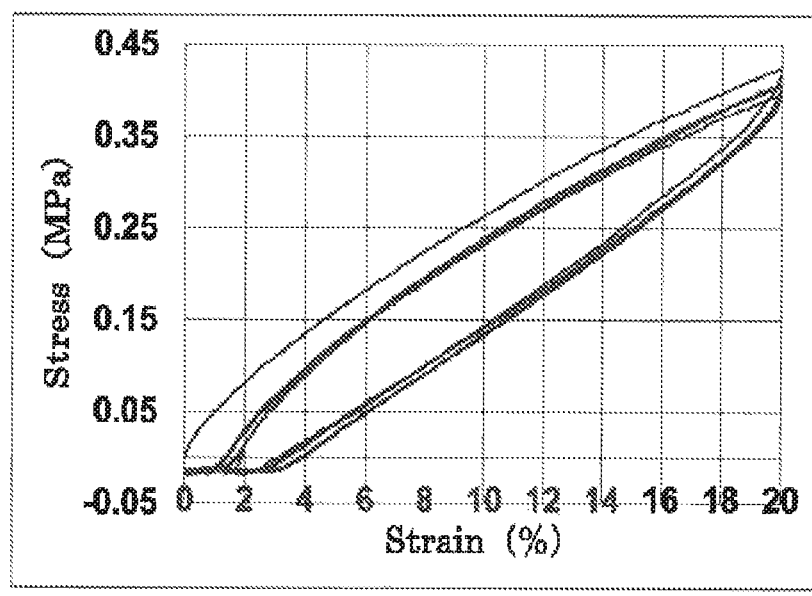
FIG. 11 is a hysteresis curve of elasticity and stress of a stretchable film in Comparative Example 3.

Further, as shown in FIG. 5, a stretchable film formed in FIG. 2 is inverted to form a stretchable film having a stretchable film second layer 6-2 formed on a face of the stretchable film first layer 6-1 where a stretchable film second layer 6-2 is not prepared. FIG. 6 or 7 is a cross-sectional view of an electrocardiograph using this type of stretchable film.

EXAMPLES

Hereinafter, the present invention will be described with reference to the Examples and Comparative Examples, but the present invention is not restricted thereto.

Those blended into a composition for forming a stretchable film as a compound containing a (meth) acrylate group as a terminal group are polyether-containing urethane (meth) acrylates 1-1 to 1-5, polycarbonate-containing silicone urethane (meth) acrylates 2-1 to 2-4, polyether/polycarbonate copolymer-containing silicone urethane (meth) acrylate 2-5, polyester-containing silicone urethane (meth) acrylates 2-6 to 2-8, polycarbonate- and polyester-containing silicone urethane (meth) acrylate 2-9.

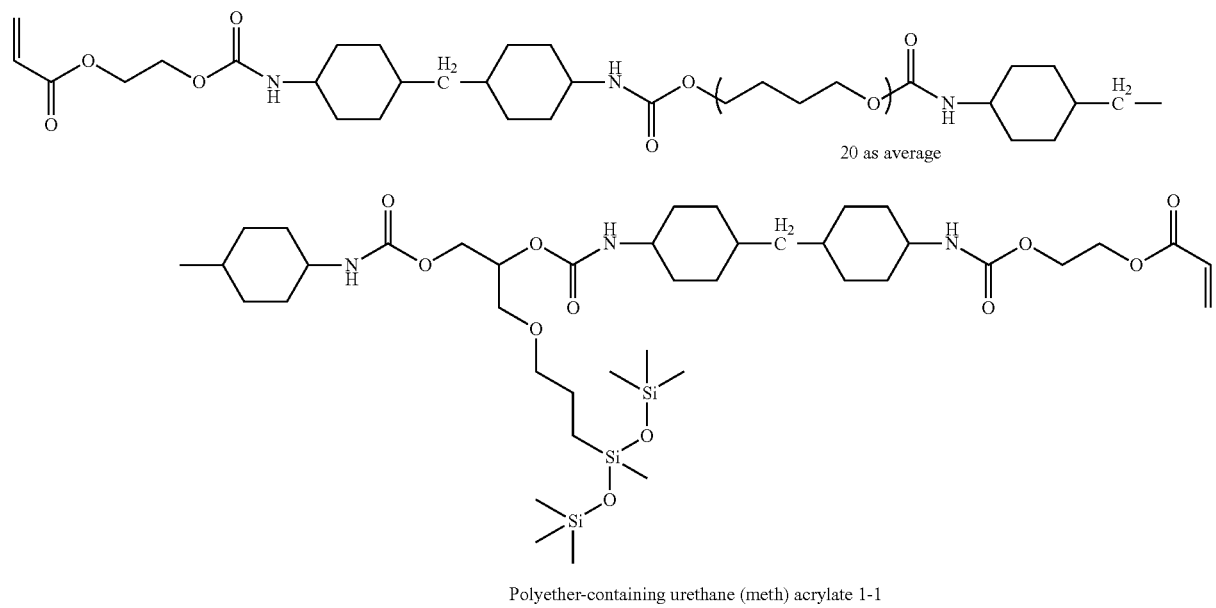

Polyether-containing urethane (meth) acrylate 1-1

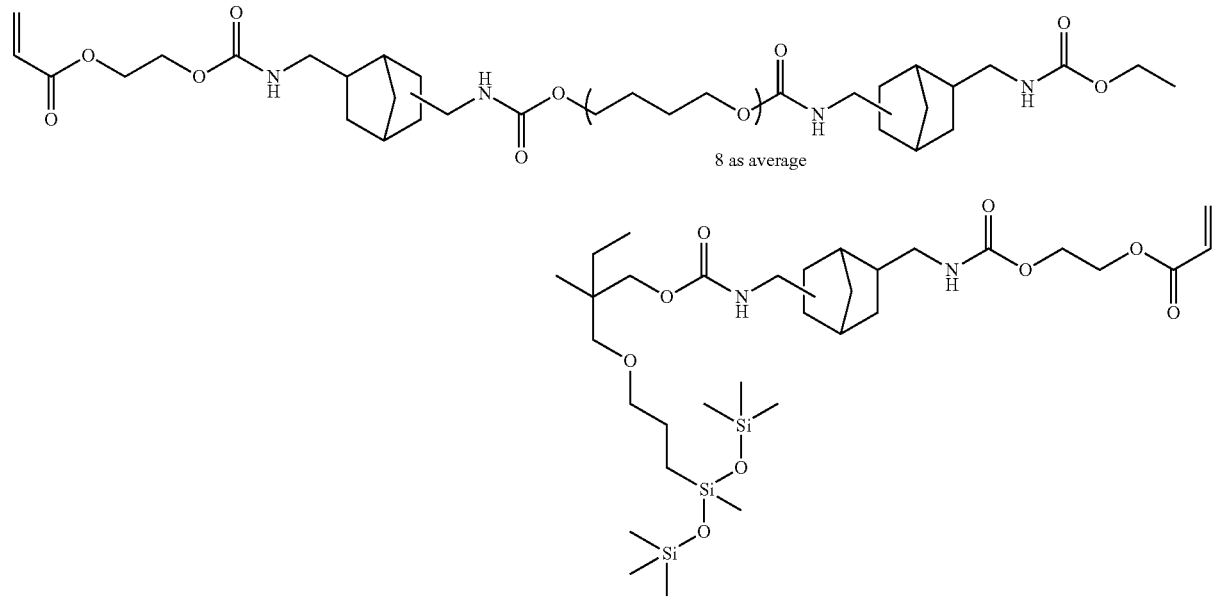

Polyether-containing urethane (meth) acrylate 1-2

-continued
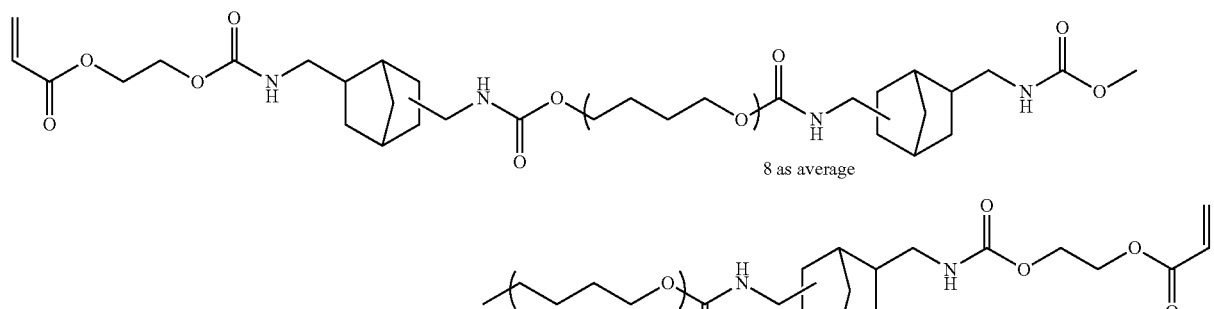
Polyether-containing urethane (meth) acrylate 1-3
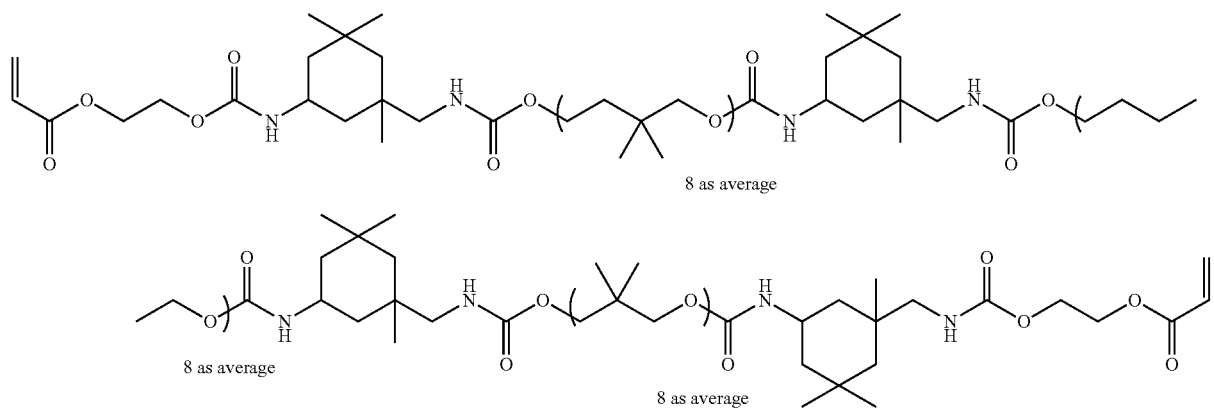
Polyether-containing urethae (meth) acrylate 1-4
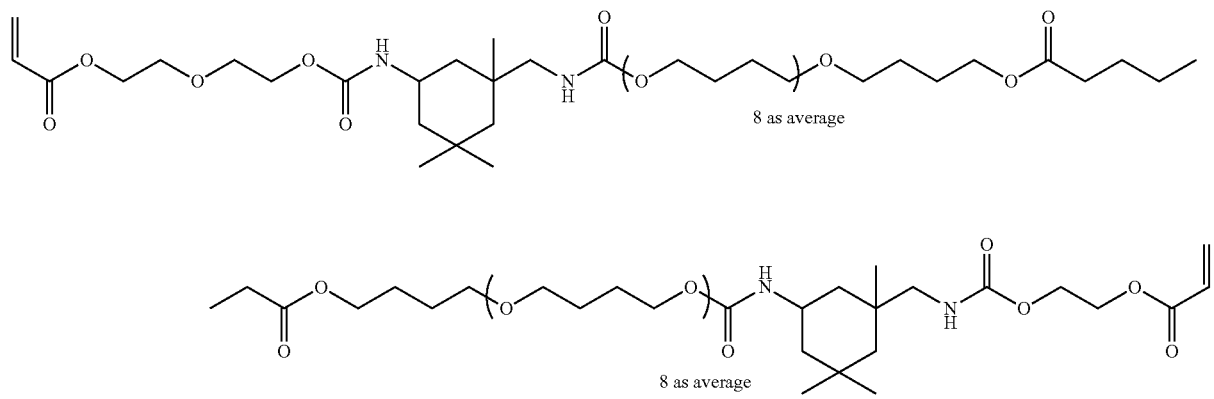
Polyether-containing urethae (meth) acrylate 1-5
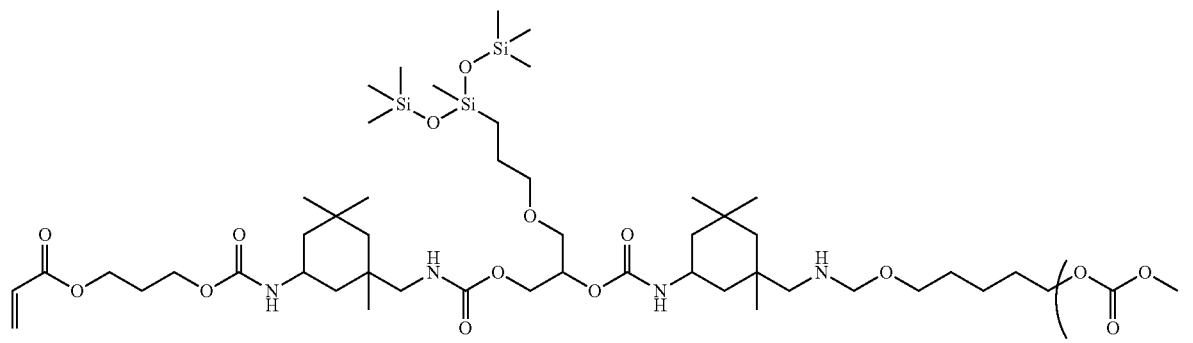

-continued
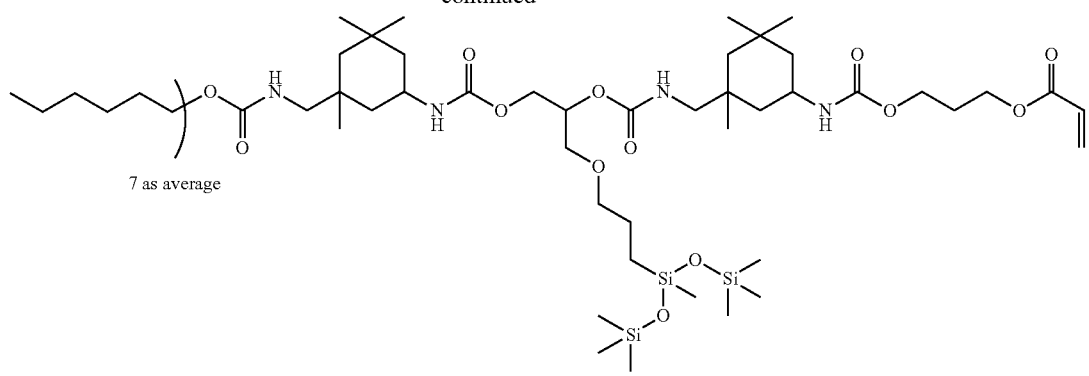
Silicone-pendant type urethane (meth) acrylate 2-1
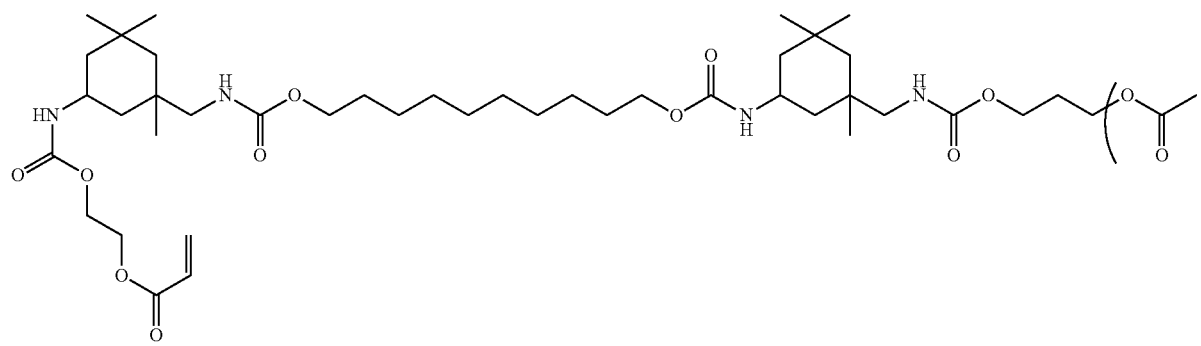
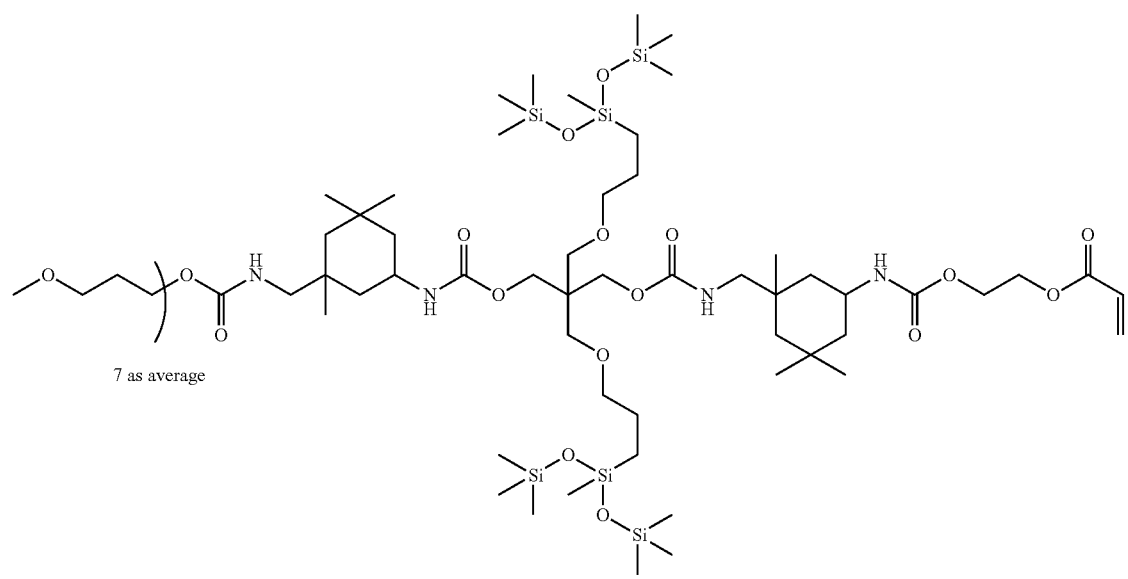
Silicone-pendant type urethane (meth) acrylate 2-2
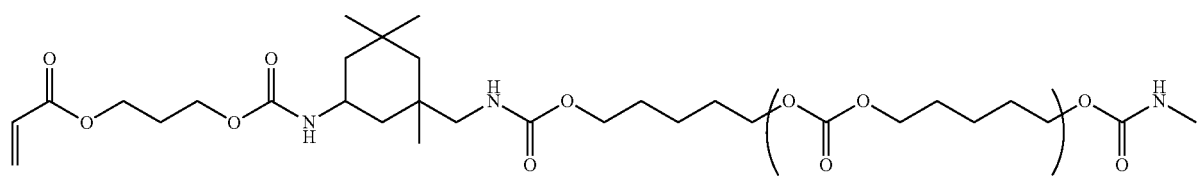

-continued
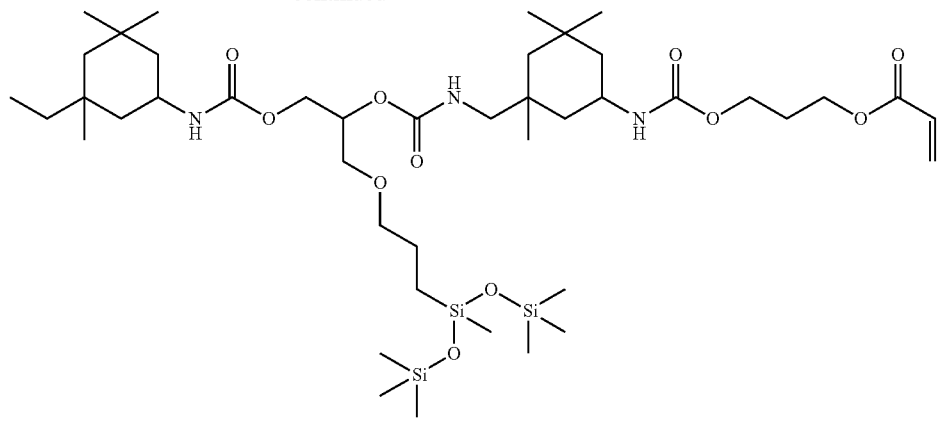
Silicone-pendant type urethane (meth) acrylate 2-3
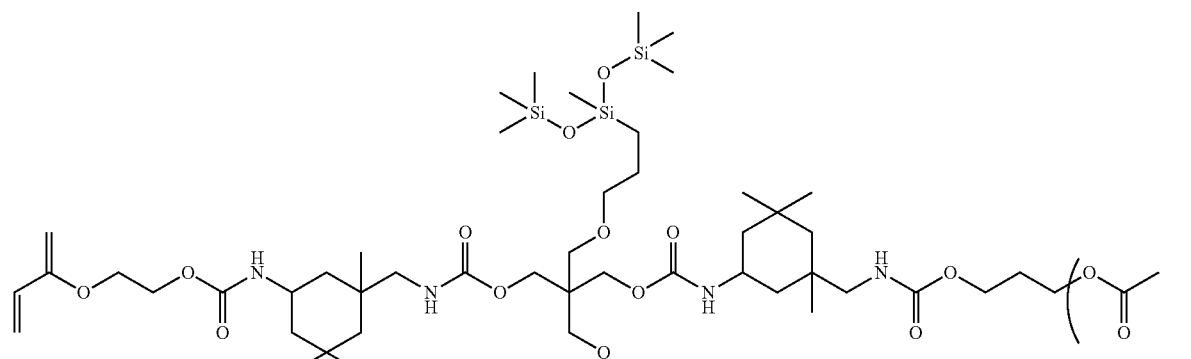
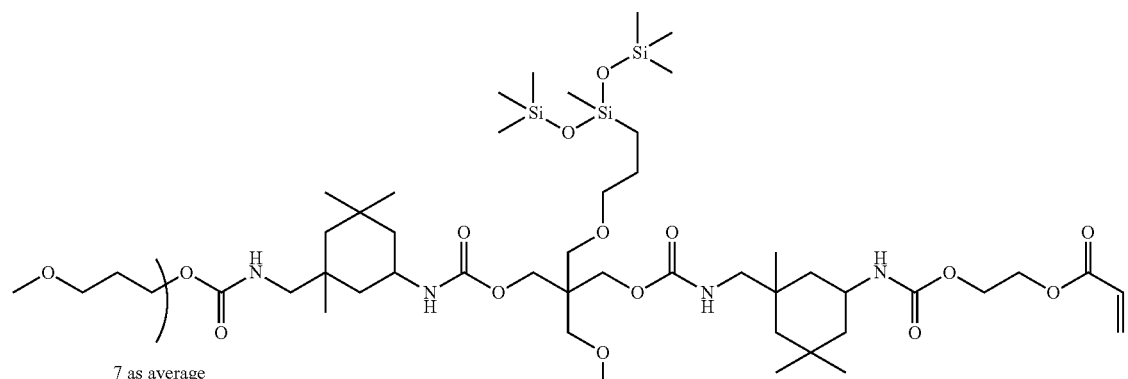
Silicone-pendant type urethane (meth) acrylate 2-4

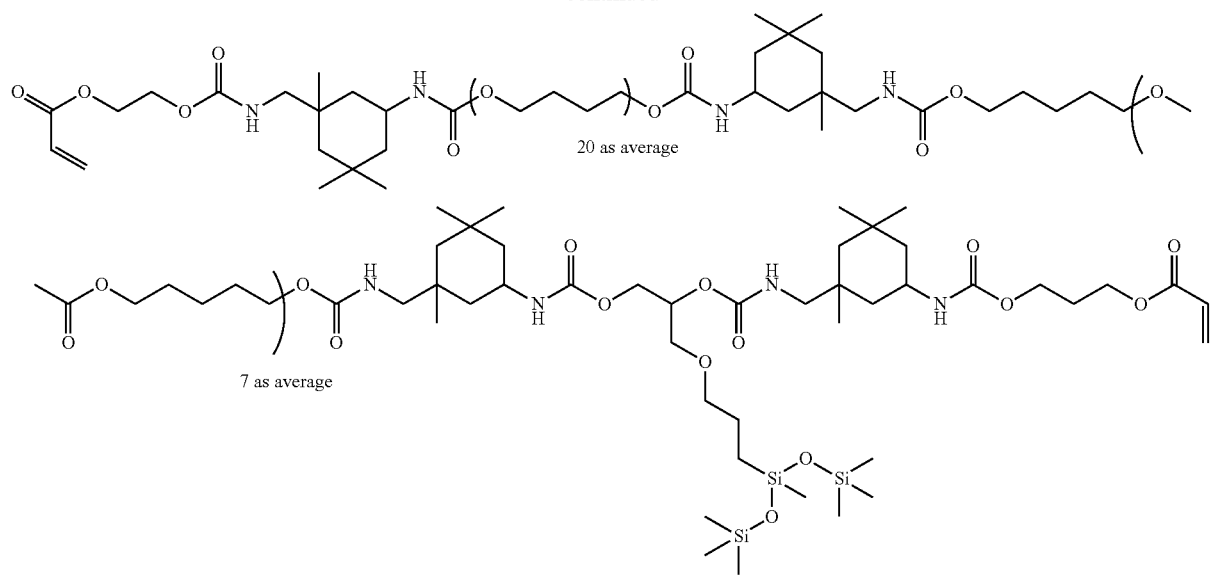
Silicone-pendant type urethane (meth) acrylate 2-5
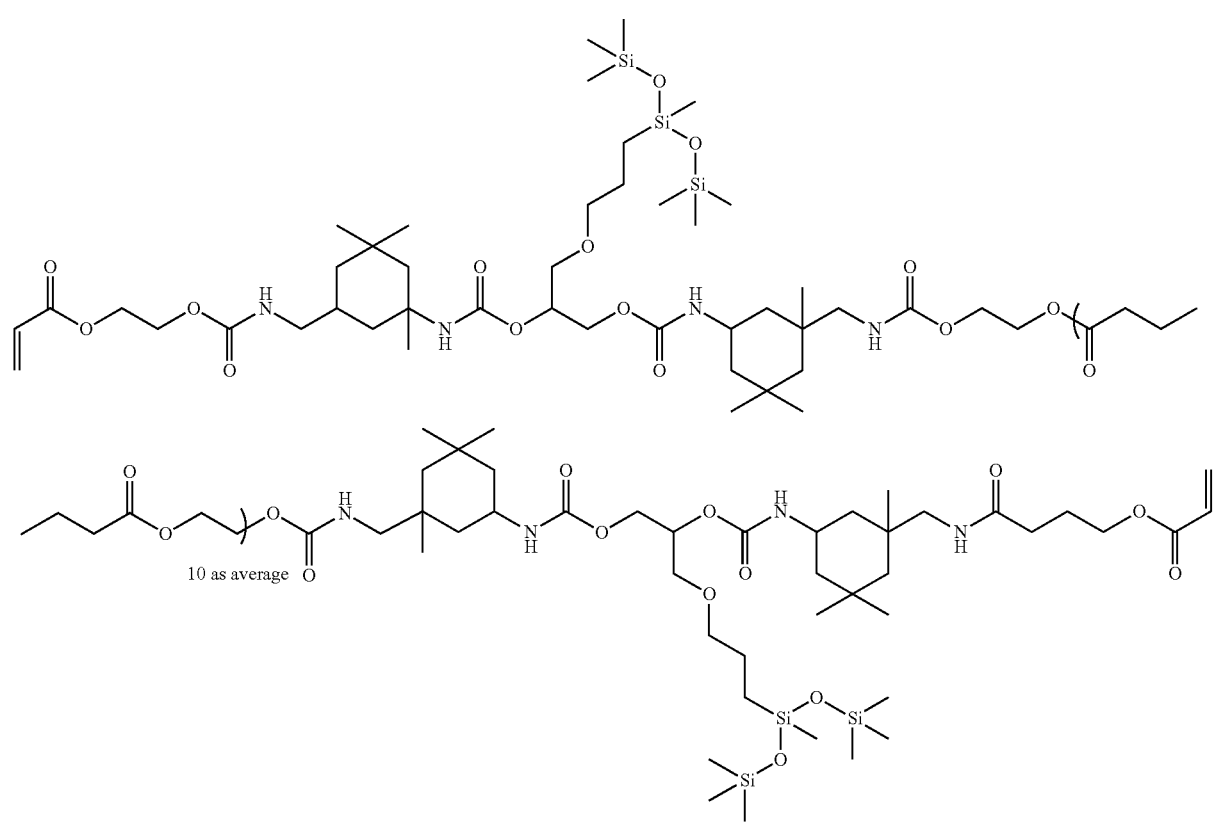
Silicone-pendant type urethane (meth) acrylate 2-6
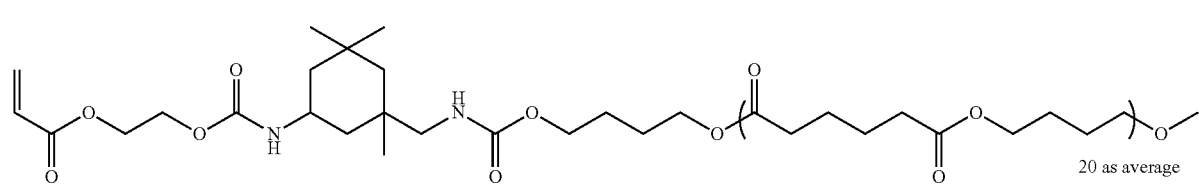

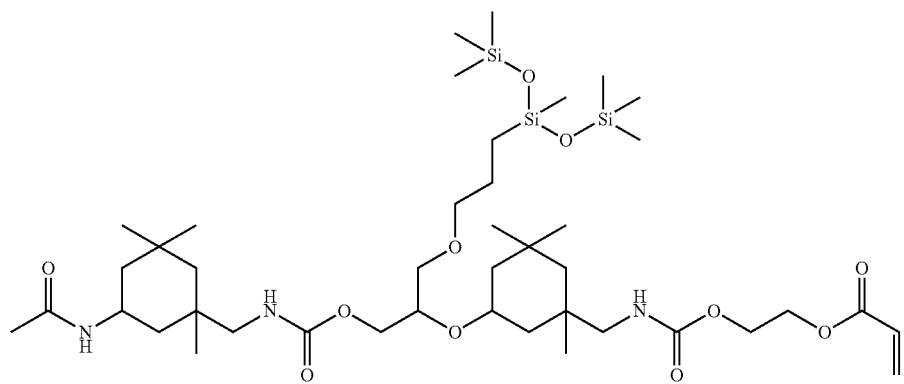
Silicone-pendant type urethane (meth) acrylate 2-7
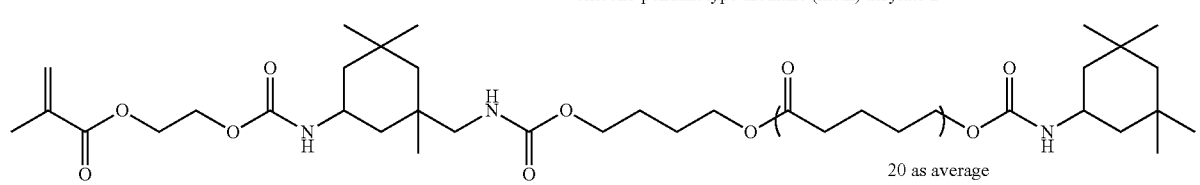
20 as average
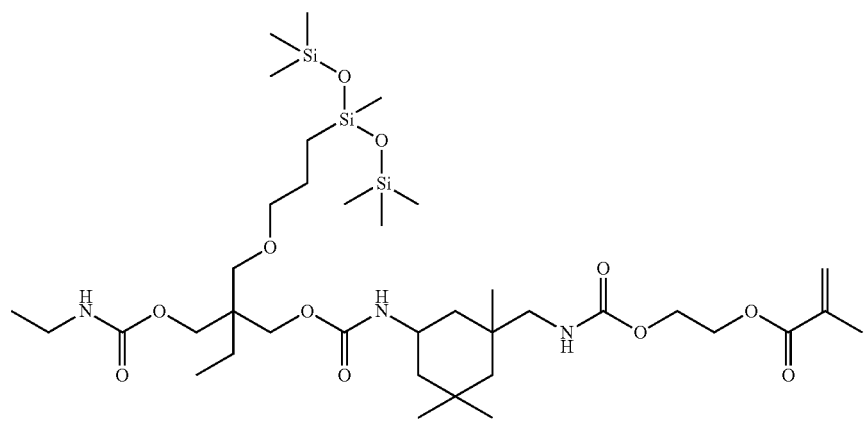
Silicone-pendant type urethane (meth) acrylate 2-8
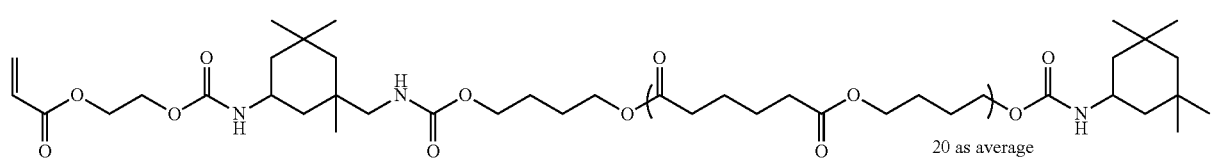
20 as average
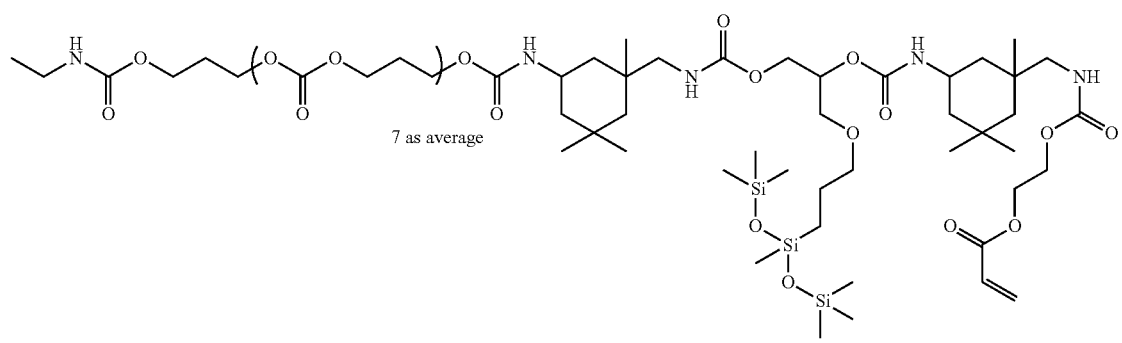
7 as average
Silicone-pendant type urethane (meth) acrylate 2-9

A photo radical generator 1 blended into a composition for forming a stretchable film as an additive is shown as follows.

Photo radical generator 1: diphenyl (2,4,6-trimethylbenzoyl) phosphine oxide

A monomer containing an alkyl group or an aryl group blended into a composition for forming a stretchable film is shown as follows.

Monomer containing an alkyl group or an aryl group: isobornyl acrylate

EXAMPLE, COMPARATIVE EXAMPLE

With compositions described in Table 1; a silicone urethane compound containing a (meth) acrylate group as a terminal group, a photo radical generator, and an organic solvent were mixed to prepare compositions for forming a stretchable film (stretchable film materials 1-1 to 1-5, and 2-1 to 2-10).

(Production of Stretchable Film)

First layer stretchable film materials 1-1 to 1-5 were applied on a polyethylene substrate by a slit coater and subjected to light exposure (500 mJ/cm$^2$) using a 1,000 W xenon lamp in nitrogen atmosphere to cure the first layers of the stretchable films.

Second layer stretchable film materials were applied on the first layers by bar-coating method. The second layer stretchable film materials 2-1 to 2-4, and 2-6 to 2-10 were subjected to light exposure (500 mJ/cm$^2$) using a 1,000 W xenon lamp in nitrogen atmosphere to cure the second layers of the stretchable films to form composite stretchable films. The second layer stretchable film material 2-5 was baked at 100° C. for 10 minutes to evaporate a solvent and subjected to light exposure (500 mJ/cm$^2$) using a 1,000 W xenon lamp in nitrogen atmosphere to cure the second layer of the stretchable film to form a composite stretchable film.

As Comparative Examples, each of single first layer stretchable film materials and single second layer stretchable

TABLE 1

| Stretchable film material | Silicone urethane acrylate (parts by mass) | Additive (parts by mass) | Organic solvent (parts by mass) |
|---|---|---|---|
| Stretchable film material 1-1 | Polyether-containing urethane (meth) acrylates 1-1 (70) Isobornyl acrylate (30) | Photo radical generator 1 (1) | — |
| Stretchable film material 1-2 | Polyether-containing urethane (meth) acrylates 1-2 (70) Isobornyl acrylate (30) | Photo radical generator 1 (1) | — |
| Stretchable film material 1-3 | Polyether-containing urethane (meth) acrylates 1-3 (75) Isobornyl acrylate (25) | Photo radical generator 1 (1) | — |
| Stretchable film material 1-4 | Polyether-containing urethane (meth) acrylates 1-4 (70) Isobornyl acrylate (30) | Photo radical generator 1 (1) | — |
| Stretchable film material 1-5 | Polyether-containing urethane (meth) acrylates 1-5 (80) Isobornyl acrylate (20) | Photo radical generator 1 (1) | — |
| Stretchable film material 2-1 | Silicone-pendant type urethane (meth) acrylates 2-1 (80) Isobornyl acrylate (20) | Photo radical generator 1 (1) | — |
| Stretchable film material 2-2 | Silicone-pendant type urethane (meth) acrylates 2-2 (70) Isobornyl acrylate (30) | Photo radical generator 1 (1) | — |
| Stretchable film material 2-3 | Silicone-pendant type urethane (meth) acrylates 2-3 (70) Isobornyl acrylate (30) | Photo radical generator 1 (1) | — |
| Stretchable film material 2-4 | Silicone-pendant type urethane (meth) acrylates 2-4 (70) Isobornyl acrylate (30) | Photo radical generator 1 (1) | — |
| Stretchable film material 2-5 | Silicone-pendant type urethane (meth) acrylates 2-1 (100) | Photo radical generator 1 (1) | PGMEA (50) |
| Stretchable film material 2-6 | Silicone-pendant type urethane (meth) acrylates 2-5 (70) Isobornyl acrylate (30) | Photo radical generator 1 (1) | — |
| Stretchable film material 2-7 | Silicone-pendant type urethane (meth) acrylates 2-6 (80) Isobornyl acrylate (20) | Photo radical generator 1 (1) | — |
| Stretchable film material 2-8 | Silicone-pendant type urethane (meth) acrylates 2-7 (70) Isobornyl acrylate (30) | Photo radical generator 1 (1) | — |
| Stretchable film material 2-9 | Silicone-pendant type urethane (meth) acrylates 2-8 (70) Isobornyl acrylate (30) | Photo radical generator 1 (1) | — |
| Stretchable film material 2-10 | Silicone-pendant type urethane (meth) acrylates 2-9 (70) Isobornyl acrylate (30) | Photo radical generator 1 (1) | — | film materials was applied by a slit coater and cured by light exposure under the above-mentioned conditions.

(Measurement of Film Thickness, Contact Angle, Stretching Property, and Strength)

The film thickness and the contact angle of water of the surface in each of the cured composite stretchable films (Examples 1 to 14) and single stretchable films (Comparative Examples 1 to 4) in Comparative Examples were measured and determined finger tackiness. After the water contact angle measurement on each of the stretchable film surfaces, the stretchable films were peeled from the substrate, and the stretching property and strength were measured according to a JIS K 6251 method. Table 2 shows the results.

As shown in Table 2, the stretchable films of the present invention obtained show high water repellency, strength, and elasticity, and low surface tackiness. In particular, it was confirmed that the stretchable films in Examples 11 to 14 where polyester-containing silicone urethane (meth) acrylate, or polycarbonate- and polyester-containing silicone urethane (meth) acrylate were blended achieve both an elongation of over 300% and high strength.

Meanwhile, the films composed on only one layer as in Comparative Examples 1 and 2 show high water repellency, strength and elasticity but surface tackiness and stickiness among films for single first layer stretchable films (in Comparative Examples 1 and 4), while the other films show

TABLE 2

| | Surface stretchable film material | Inner stretchable film material | Surface stretchable film thickness (μm) | Inner stretchable film thickness (μm) | Contact angle (degrees) | Elongation (%) | Strength (MPa) | Surface tackiness |
|---|---|---|---|---|---|---|---|---|
| Example 1 | Elastic material 2-1 | Stretchable film material 1-1 | 12 | 180 | 98 | 330 | 13.1 | None |
| Example 2 | Elastic material 2-1 | Stretchable film material 1-2 | 15 | 190 | 98 | 380 | 14.1 | None |
| Example 3 | Elastic material 2-1 | Stretchable film material 1-3 | 17 | 210 | 97 | 390 | 15.3 | None |
| Example 4 | Elastic material 2-1 | Stretchable film material 1-4 | 15 | 226 | 96 | 350 | 14.3 | None |
| Example 5 | Elastic material 2-1 | Stretchable film material 1-5 | 14 | 160 | 98 | 290 | 16.0 | None |
| Example 6 | Elastic material 2-2 | Stretchable film material 1-1 | 20 | 230 | 104 | 390 | 14.5 | None |
| Example 7 | Elastic material 2-3 | Stretchable film material 1-1 | 18 | 250 | 95 | 370 | 14.3 | None |
| Example 8 | Elastic material 2-4 | Stretchable film material 1-1 | 15 | 210 | 105 | 360 | 14.8 | None |
| Example 9 | Elastic material 2-5 | Stretchable film material 2-1 | 6 | 360 | 96 | 330 | 14.0 | None |
| Example 10 | Elastic material 2-6 | Stretchable film material 1-1 | 14 | 230 | 96 | 350 | 14.1 | None |
| Example 11 | Elastic material 2-7 | Stretchable film material 1-1 | 22 | 160 | 97 | 380 | 18.1 | None |
| Example 12 | Elastic material 2-8 | Stretchable film material 1-1 | 25 | 140 | 94 | 370 | 19.1 | None |
| Example 13 | Elastic material 2-9 | Stretchable film material 1-1 | 28 | 150 | 95 | 390 | 20.3 | None |
| Example 14 | Elastic material 2-10 | Stretchable film material 1-1 | 32 | 150 | 99 | 310 | 22.3 | None |
| Comparative Example 1 | — | Stretchable film material 1-1 | — | 321 | 96 | 340 | 13.2 | Found |
| Comparative Example 2 | — | Stretchable film material 2-1 | — | 280 | 98 | 70 | 40.1 | None |
| Comparative Example 3 | — | Stretchable film material 2-6 | — | 280 | 96 | 280 | 17.2 | Slightly found |
| Comparative Example 4 | — | Stretchable film material 1-3 | — | 200 | 76 | 400 | 13.8 | Found | no surface tackiness but poor elasticity for single second layer stretchable films (in Comparative Examples 2 and 3).
(Measurement of Hysteresis)

The film sheets in Example 1, Comparative Examples 1 to 3 cured by the above-mentioned method were cut into 13 cm×15 cm pieces, elongated at a rate of 5%/min in the range of 0 to 20% using a tensile tester (AGS-1X 1KN, Product from Shimadzu Corporation) to measure the stress and determine a hysteresis curve. FIGS. 8 to 11 show the hysteresis curves.

In a repetitive stretching test for the stretchable film in Example 1, the stress increases in proportion to the degree of extension during elongation, decreases during shrinkage, and returns to approximately 0 when the degree of extension is 0%. The test found that the stretchable film in Example 1 has a linear relationship between the degree of extension and the stress, and the film is excellent in hysteresis of elasticity and stress. Meanwhile, in Comparative Examples 2 and 3, the degree of extension and the stress shows no such linear relationship, resulting in poor hysteresis of elasticity and stress. The stretchable film in Comparative Example 1 (single first layer stretchable film in Example 1) shows favorable hysteresis of elasticity and stress, but as described above, surface tackiness and stickiness among films.

As described above, the stretchable film of the present invention has excellent elasticity and strength, and excellent water repellency and low tackiness on the film surface, and favorable hysteresis in repeated elongation, showing excellent properties as a film capable of printing an elastic wire used in wearable devices and the like.

It must be stated here that the present invention is not restricted to the embodiments shown by Examples. The embodiments shown by Examples are merely examples so that any embodiments composed of substantially the same technical concept as disclosed in the claims of the present invention and expressing a similar effect are included in the technical scope of the present invention.

The invention claimed is:

1. A composite stretchable film comprising:
a surface film which is a cured product of a polyurethane 1 containing a copolymer of a unit "a1" having polycarbonate and urethane bonds, and a silicone-pendant type urethane unit "b1" represented by the following general formula (1); and
an inner film which is a cured product of a polyurethane 2 containing a unit "c" having polyether and urethane bonds represented by the following general formula (2), on which the surface film is laminated, wherein
the composite stretchable film has a stretching property of 20 to 1000% in a tensile test regulated by JIS K 6251:

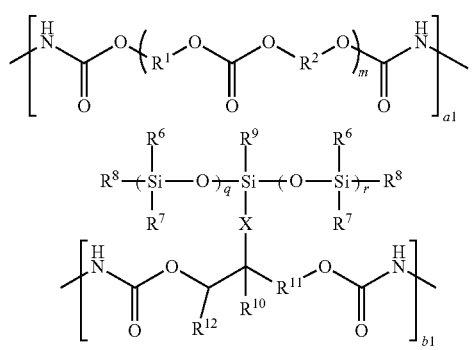

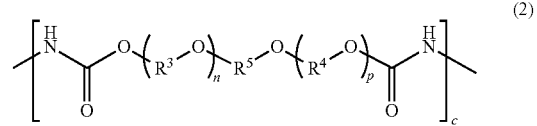

wherein, $R^1$ and $R^2$ represent a pentamethylene group; $R^3$ and $R^4$ represent a butylene group; $R^5$ represents a linear or branched alkylene group having 2 to 20 carbon atoms; $R^6$, $R^7$, and $R^8$ represent a methyl group $R^9$ represents a methyl group; $R^{10}$ represents a hydrogen atom; $R^{11}$ represents a single bond; $R^{12}$ represents a hydrogen atom; X represents a linear alkylene group having 3 to 7 carbon atoms, and optionally containing an ether group; m, n, and p represent an integer of 1 to 200, and q, and r represent an integer of 0 to 20; and a1, b1, and c represent a ratio of the repeating unit satisfying inequalities 0<a1<1.0, and 0<b1<1.0 in the polyurethane 1.

2. A product comprising the composite stretchable film according to claim 1 in contact with a conductive wiring having stretchability.

3. The composite stretchable film according to claim 1, wherein the polyurethane 1 is a polymer having a structure further containing a (meth) acrylate group as a terminal group represented by the following general formula (3):

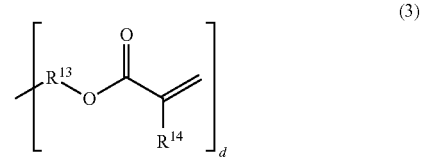

wherein, $R^{13}$ represents a linear, branched, or cyclic alkylene group having 1 to 20 carbon atoms, and optionally containing an ether group; $R^{14}$ represents a hydrogen atom; and d represents the number of units in one molecule satisfying an inequality 1<d<4.

4. A product comprising the composite stretchable film according to claim 3 in contact with a conductive wiring having stretchability.

5. A film comprising the composite stretchable film according to claim 1 coated on a stretchable wire.

6. A film comprising the composite stretchable film according to claim 3 coated on a stretchable wire.

7. A method for forming a composite stretchable film, comprising:
applying a polyurethane 1 containing a copolymer of a unit "a1", having polycarbonate and urethane bonds, and a silicone-pendant type urethane units "b 1" represented by the following general formula (1) on an inner film which is a cured product of a polyurethane 2 containing a unit "c" having polyether and urethane bonds represented by the following general formula (2); and curing the polyurethane 1 by heating and/or light exposure to form a surface film, wherein
the composite stretchable film has a stretching property of 20 to 1000% in a tensile test regulated by JIS K 625:

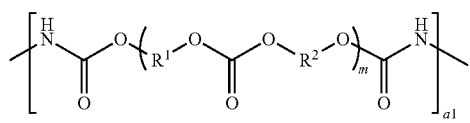
(1)

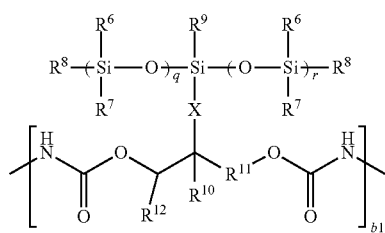

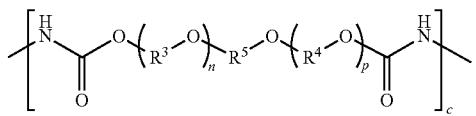
(2)

wherein, $R^1$ and $R^2$ represent a pentamethylene group; $R^3$ and $R^4$ represent a butylene group; $R^5$ represents a linear or branched alkylene group having 2 to 20 carbon atoms; $R^6$, $R^7$, and $R^8$ represent a methyl group; $R^9$ represents a methyl group; $R^{10}$ represents a hydrogen atom; $R^{11}$ represents a single bond; $R^{12}$ represents a hydrogen atom; X represents a linear alkylene group having 3 to 7 carbon atoms, and optionally containing an ether group; m, n, and p represent an integer of 1 to 200, and q, and r represent an integer of 0 to 20; and a1, b1, and c represent a ratio of the repeating unit satisfying inequalities 0<a1<1.0, and 0<b1<1.0 in the polyurethane 1.

8. The method for forming a composite stretchable film according to claim 7, wherein the polyurethane 2 is applied on a substrate and cured by heating and/or light exposure to form the inner film.

\* \* \* \* \*